(12) United States Patent
Strauβ et al.

(10) Patent No.: US 8,973,458 B2
(45) Date of Patent: Mar. 10, 2015

(54) GEAR UNIT

(75) Inventors: Dietmar Strauβ, Kraichtal (DE); Ingo Schütterle, Sigmaringen (DE)

(73) Assignee: SEW-EURODRIVE GmbH & Co. KG, Bruchsal (DE)

( * ) Notice: Subject to any disclaimer, the term of this patent is extended or adjusted under 35 U.S.C. 154(b) by 171 days.

(21) Appl. No.: 13/260,517

(22) PCT Filed: Mar. 11, 2010

(86) PCT No.: PCT/EP2010/001538
§ 371 (c)(1),
(2), (4) Date: Sep. 26, 2011

(87) PCT Pub. No.: WO2010/108601
PCT Pub. Date: Sep. 30, 2010

(65) Prior Publication Data
US 2012/0024097 A1 Feb. 2, 2012

(30) Foreign Application Priority Data

Mar. 25, 2009 (DE) .......................... 10 2009 014 315

(51) Int. Cl.
*F16H 57/02* (2012.01)
*F16H 57/04* (2010.01)
*F16H 61/00* (2006.01)

(52) U.S. Cl.
CPC ........ *F16H 57/0447* (2013.01); *F16H 57/0416* (2013.01); *F16H 57/0423* (2013.01); *F16H 57/045* (2013.01); *F16H 57/0471* (2013.01); *F16H 57/0495* (2013.01)
USPC .......... 74/467; 74/606 R; 74/606 A; 184/6.12

(58) Field of Classification Search
USPC ................ 74/467, 606 A, 606 R; 165/41, 96; 184/11.1, 11.2, 13.1, 6.12; 384/462, 384/464, 467, 473, 474, 476; 475/161
See application file for complete search history.

(56) References Cited

U.S. PATENT DOCUMENTS

| 1,143,307 A | 6/1915 | Noyes |
| 1,220,810 A | 3/1917 | Alquist |
| 1,549,305 A * | 8/1925 | Hardwick .................... 184/11.1 |

(Continued)

FOREIGN PATENT DOCUMENTS

| DE | 825 359 | 3/1952 |
| DE | 858 920 | 12/1952 |

(Continued)

OTHER PUBLICATIONS

European Office Action, dated Jul. 18, 2012, issued in corresponding European Patent Application No. 10708730.6.

(Continued)

*Primary Examiner* — David M Fenstermacher
*Assistant Examiner* — Jake Cook
(74) *Attorney, Agent, or Firm* — Kenyon & Kenyon LLP

(57) ABSTRACT

A gear unit having at least one shaft supported by a bearing in the gear unit housing, the spatial region of a bearing of a shaft situated in a cutout of the gear unit housing being limited at least partially towards the interior of the gear unit by a limiting device, in particular one that has a cutout for a shaft supported in the bearing, the lowest point of the cutout effecting a minimum oil level in the spatial region of the bearing.

49 Claims, 18 Drawing Sheets

(56) References Cited

U.S. PATENT DOCUMENTS

| | | | | |
|---|---|---|---|---|
| 1,902,934 A * | 3/1933 | Acker | | 74/606 R |
| 1,971,781 A | 8/1934 | Henderson et al. | | |
| 2,147,391 A * | 2/1939 | Acker | | 74/606 A |
| 2,186,269 A * | 1/1940 | Pelphrey | | 184/6.12 |
| 2,489,699 A * | 11/1949 | Clark | | 184/11.1 |
| 2,532,779 A * | 12/1950 | Parks | | 384/428 |
| 2,536,385 A | 1/1951 | Miller | | |
| 2,602,522 A * | 7/1952 | Roos | | 184/11.1 |
| 2,860,726 A * | 11/1958 | Thomas et al. | | 184/11.1 |
| 2,950,943 A * | 8/1960 | Forrest | | 384/465 |
| 3,029,661 A | 4/1962 | Schmitter | | |
| 3,254,925 A * | 6/1966 | Cox | | 384/132 |
| 3,529,698 A | 9/1970 | Nelson | | |
| 3,625,310 A * | 12/1971 | Herrick | | 184/6.12 |
| 3,806,214 A * | 4/1974 | Keiser | | 384/589 |
| 4,242,923 A * | 1/1981 | Nishikawa et al. | | 475/160 |
| 4,612,818 A * | 9/1986 | Hori et al. | | 74/467 |
| 4,630,711 A | 12/1986 | Levrai et al. | | |
| 4,633,938 A * | 1/1987 | Schunck et al. | | 165/47 |
| 4,872,502 A * | 10/1989 | Holzman | | 165/299 |
| 4,952,077 A | 8/1990 | Kurt | | |
| 5,522,476 A * | 6/1996 | Holman | | 184/6.12 |
| 5,597,370 A * | 1/1997 | Nogle | | 475/159 |
| 5,622,051 A | 4/1997 | Iida et al. | | |
| 5,718,651 A | 2/1998 | Merkle et al. | | |
| 5,725,072 A | 3/1998 | Yamamoto et al. | | |
| 5,768,954 A | 6/1998 | Grabherr et al. | | |
| 5,927,384 A * | 7/1999 | Waldner, Jr. | | 165/47 |
| 6,036,615 A * | 3/2000 | Young et al. | | 475/161 |
| 6,474,444 B1 | 11/2002 | Mochizuki | | |
| 6,644,439 B2 | 11/2003 | Schnitzer | | |
| 6,991,574 B2 * | 1/2006 | Martin, III | | 475/159 |
| 6,997,284 B1 | 2/2006 | Nahrwold | | |
| 7,445,574 B2 * | 11/2008 | Weith | | 475/160 |
| 2003/0083171 A1 | 5/2003 | Turner et al. | | |
| 2004/0188946 A1 * | 9/2004 | Weiler | | 277/411 |
| 2005/0103570 A1 | 5/2005 | Gibson et al. | | |
| 2006/0048600 A1 * | 3/2006 | Taguchi et al. | | 74/607 |
| 2006/0060424 A1 * | 3/2006 | Tominaga et al. | | 184/11.1 |
| 2006/0231337 A1 | 10/2006 | Vogeltanz | | |
| 2006/0278475 A1 * | 12/2006 | Takahashi et al. | | 184/6.12 |

FOREIGN PATENT DOCUMENTS

| | | | | |
|---|---|---|---|---|
| DE | 1 720 409 | | 4/1956 | |
| DE | 1 034 430 | | 7/1958 | |
| DE | 1 946 942 | | 9/1966 | |
| DE | 1 984 404 | | 4/1968 | |
| DE | 1 989 640 | | 7/1968 | |
| DE | 12 91 966 | | 4/1969 | |
| DE | 36 06 963 | | 9/1986 | |
| DE | 41 32 780 | | 4/1992 | |
| DE | 44 14 164 | | 10/1995 | |
| DE | 195 29 586 | | 8/1996 | |
| DE | 196 52 834 | | 10/1997 | |
| DE | 197 11 743 | | 9/1998 | |
| DE | 198 56 941 | | 2/2000 | |
| DE | 100 36 975 | | 4/2001 | |
| DE | 100 51 356 | | 4/2002 | |
| DE | 10 2004 022 863 | | 12/2005 | |
| DE | 10 2005 005 154 | | 8/2006 | |
| DE | 10 2005 031 197 | | 1/2007 | |
| EP | 0 353 445 | | 2/1990 | |
| EP | 0 853 225 | | 7/1998 | |
| GB | 409 883 | | 5/1934 | |
| GB | 493 698 | | 10/1938 | |
| GB | 757 480 | | 9/1956 | |
| GB | 1 426 352 | | 2/1976 | |
| GB | 2 166 816 | | 5/1986 | |
| GB | 2 271 161 | | 4/1994 | |
| JP | 05215203 A * | | 8/1993 | F16H 57/02 |
| JP | 07-217715 | | 8/1995 | |
| JP | 11-051159 | | 2/1999 | |
| WO | WO 2007/124885 | | 11/2007 | |

OTHER PUBLICATIONS

International Search Report, issued in corresponding International Application No. PCT/EP2010/001538.
International Preliminary Report on Patentability, issued in corresponding International Application No. PCT/EP2010/001538.
International Preliminary Report on Patentability, issued in corresponding International Application No. PCT/EP2010/001536.
International Search Report, issued in corresponding International Application No. PCT/EP2010/001536.
International Preliminary Report on Patentability, issued in corresponding International Application No. PCT/EP2010/001537.
International Search Report, issued in corresponding International Application No. PCT/EP2010/001537.
International Preliminary Report on Patentability, issued in corresponding International Application No. PCT/EP2010/001535.
International Search Report, issued in corresponding International Application No. PCT/EP2010/001535.
European Office Action, dated Jul. 19, 2012, issued in corresponding European Patent Application No. 10710203.0.
European Office Action, dated Jul. 19, 2012, issued in corresponding European Patent Application No. 10708729.8.
European Office Action, dated Jan. 24, 2013, issued in corresponding European Patent Application No. 10710202.2.
European Office Action, dated Jul. 20, 2012, issued in corresponding European Patent Application No. 10710202.2.

* cited by examiner

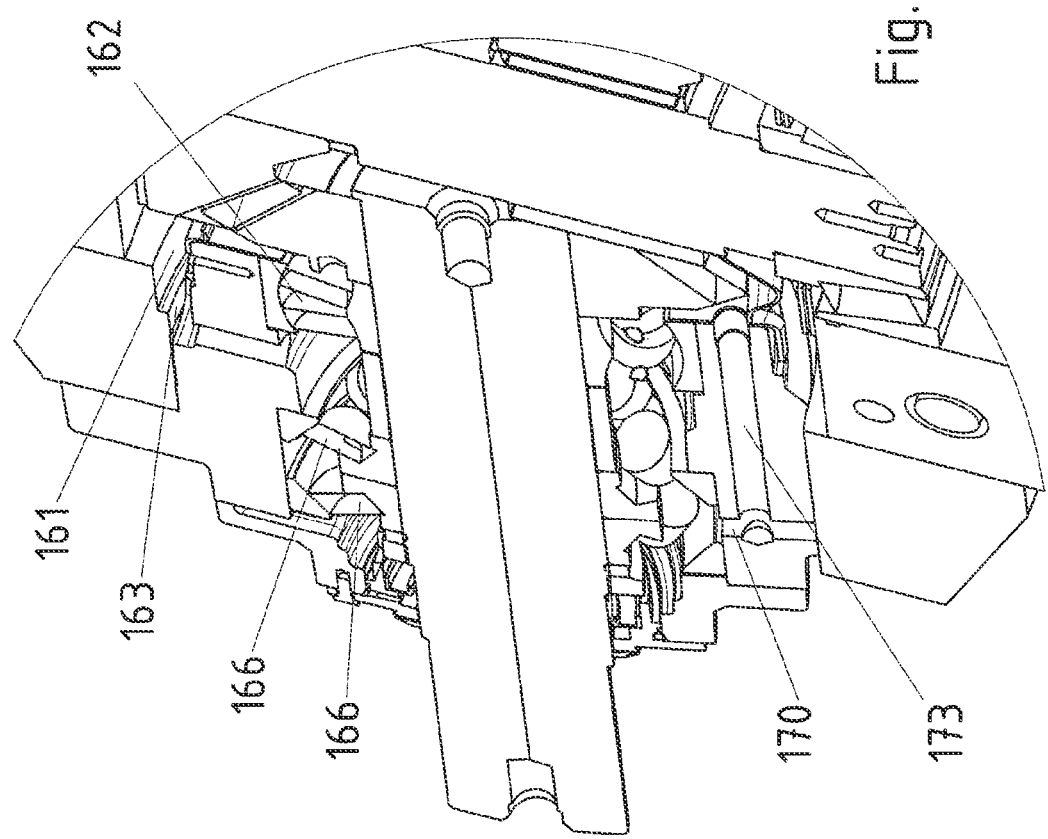

GEAR UNIT

FIELD OF THE INVENTION

The present invention relates to a gear unit.

BACKGROUND INFORMATION

It is known that gear units having oil lubrication are practicable, the oil, that is, fluid, collecting in the lower part of the interior of the gear unit when the gear unit is not in operation, that is, when the gears are at rest, where it forms the oil sump that has an oil level corresponding to the filling level when filling in the oil. When operating the gear unit, in particular at the nominal speed of the input shaft and/or output shaft, the toothed parts of the gear unit spray and centrifuge the oil around. In particular, the mutually engaged toothings also spray out oil.

SUMMARY

Example embodiments of the present invention provide a gear unit such that as much power as possible is transmittable per unit volume.

Among features of example embodiments of the present invention in the gear unit are that the spatial region of a bearing of a shaft situated in a cutout of the gear unit housing is limited at least partially towards the interior of the gear unit by a limiting device that has a cutout for a shaft supported in the bearing, the lowest point of the cutout effecting a minimum oil level in the spatial region of the bearing.

It is advantageous in this regard that a minimum oil level is thus ensured in operation in the area of the bearings and that the latter are thus well lubricated. In the state of rest of the gear unit, a higher oil level than this minimum oil level is allowed, which is lowered when operating the gear unit. A very good initial lubrication of the bearing is thus provided and the losses in operation are nevertheless reducible.

In example embodiments, the spatial region is limited at least partially by the gear unit housing. It is advantageous in this regard that the spatial region is the region of the bearing, which is to be limited towards the interior of the gear unit only by the protective plate.

In example embodiments, the limiting device is a protective plate or a ring. It is advantageous in this regard that a simple and cost-effective limitation of the spatial region is achievable.

In example embodiments, the protective plate is welded onto the housing or is connected by screws. It is advantageous in this regard that a sealed connection may be produced in a simple and cost-effective manner.

In example embodiments, the ring is provided in a groove, in particular in a groove in the housing of the gear unit that extends around in the circumferential direction. It is advantageous in this regard that the minimum oil level is specifiable in a simple manner. Although such a ring does not provide as high a protection against spraying oil as the use of a protective plate, it offers a simple manner of ensuring the minimum oil level.

In example embodiments, the cutout encloses the traversing shaft as tightly as possible, in particular at a distance of less than 3 mm, in particular of less than 1 mm. It is advantageous in this regard that a maximum protection against spraying oil or oil foam is achievable.

In example embodiments, the protective plate is flat, in particular covers the area of the cutout for the bearing. It is advantageous in this regard that a simple sheet-metal stamped part may be used, in which only the outer contour and the cutouts for the passage of shafts, in particular semicircular cutouts provided in the edge region of the protective plate, are required.

In example embodiments, the housing of the gear unit includes a lower and an upper housing part, the assembly of the gear unit being very simple and not requiring much effort, a protective plate being fastened on the lower housing part, which substantially surrounds the lower half of the shaft, another protective plate being fastened on the upper housing part, which substantially surrounds the upper half of the shaft. It is advantageous in this regard that the insertion of a ring or of a protective plate is particularly simple. Components such as bearings, shafts and gear wheels are also mountable in a simple manner. For these are simply inserted from above into the corresponding receiving area. In the case of a ring, the receiving area is a groove running in the circumferential direction. The protective plate by contrast is insertable from above and may then be pressed against the housing wall. Subsequently, a welded and/or screwed connection may be performed.

In example embodiments, a bearing is provided in one housing part of the gear unit for supporting the input shaft, a fan impeller being provided on the input shaft, the housing part being slanted at least in the surface area adjacent to the fan impeller and/or a slanted hood being attached to the housing part.

It is advantageous in this regard that the cooling air flow is able to be guided as well as possible and that therefore a greatest possible portion of the air flow flows along the housing. In this manner, a powerful cooling air flow capable of dissipating heat from the gear unit is producible by a fan impeller that is driven passively, that is, without a separate motive drive, and a great output is producible per unit volume.

In example embodiments, cooling fins are provided on the slanted area of the housing part or on the hood. It is advantageous in this regard that the surface is enlarged and thus an improved heat dissipation is ensured. In particular, the heat from the housing may thus be conducted via air to the hood and from their to the surroundings. In addition, the slanted housing part or the slanted hood acts as an air guide element and reduces turbulence.

In example embodiments, cooling fins and/or cooling fingers are provided on the housing part of the gear unit. It is advantageous in this regard that the surface is enlarged. In the case of cooling fingers, it is even possible to achieve an isotropic heat dissipation, that is, a heat dissipation that is independent of the installation orientation of the gear unit.

In example embodiments, a housing cover is provided on the housing of the gear unit, which is tightly connectable to one housing part and which has cooling fins on its outside. It is advantageous in this regard that a large opening is provided in the housing of the gear unit for installation, maintenance or for an oil change.

In example embodiments, the cooling fins are oriented according to the direction of the cooling air flow, the cooling fins in particular being oriented in parallel to one another. It is advantageous in this regard that the air flow may be configured in a suitable manner and that in particular an air guide function is implementable.

In example embodiments, the input gear stage is a right-angle gear stage. It is advantageous in this regard that a slanted housing may be provided and thus an improved air guide function may be achieved.

In example embodiments, an air guide encasement is provided around the gear unit. It is advantageous in this regard that the cooling air flow may be guided through between the gear unit housing and the encasement and thus a very good utilization of the cooling air flow is achievable in a simple manner. In addition, another protection is provided for the gear unit housing, in particular for bearing covers, screw plugs and/or oil drain plugs and the like. Such parts may thus also be implemented in plastic instead of steel or cast steel since the encasement may be implemented from sheet steel and thus a metallic protection is provided against the surroundings.

In example embodiments, the air guide encasement guides the cooling air flow and limits it together with the cooling fins and the housing of the gear unit to the spatial region provided for the cooling air flow, in particular in such a way that the cooling air flow takes up as much thermal output of the gear unit as possible. It is advantageous in this regard that the air flow may be guided in such a way that the air flow is able to dissipate the heat of the housing as much as possible.

In example embodiments, the air guide encasement has passages for the input and output shaft and for setting up the gear unit on the floor, the air guide encasement in particular having additionally only one more cutout for a sensor. It is advantageous in this regard that the cutouts may be implemented in a simple manner, that is, it is not necessary to implement them in a sealed manner.

In example embodiments, a pipe is provided for conducting oil out of the interior of the gear unit into the area of the cooling air flow, and a pipe for guiding the oil back into the interior of the gear unit is likewise provided in the area of the cooling air flow, the lines in particular being situated entirely or at least in part in the cooling air flow produced by the fan impeller. It is advantageous in this regard that a cooling of the oil of the gear unit is achievable in a simple manner. In particular, all that is required is for the oil in a pipe to be conducted out and back in again.

In example embodiments, the oil transported out via the pipe is supplied to a plate-type cooler, which is situated on the housing of the gear unit, in particular in the cooling air flow, the pipe for returning the oil in particular transporting oil from the plate-type cooler back into the interior of the gear unit. It is advantageous in this regard that an improved heat dissipation may be achieved, the plate-type cooler being in particular able to be disposed in the cooling air flow and thus able to be cooled passively. Via a meander-shaped routing in the plate-type cooler, the oil flow is in contact with the plate-type cooler for a very long time and is thus able to give off the greatest possible heat flow to the air.

In example embodiments, the oil level, in particular of the oil sump of the gear unit, is lower in operation than the oil level at a permanent standstill of the gear unit, a device being provided in particular for lowering the operating oil level, the device for lowering being in particular a device for the temporary storage of oil. It is advantageous in this regard that the bearing and toothed parts are well-drenched in oil when starting the gear unit since the oil level is initially very high. In operation, that is, with the oil level lowered, splash losses are reduced and a lubrication of the bearings or toothed parts is achievable from the temporary storage unit via other feeder devices. These feeder devices are operable in operation without representing an additional energy loss of the gear unit.

In example embodiments, a temporary storage unit is provided, to which oil may be supplied from the oil sump of the gear unit, in particular using a feeder device, the temporary storage unit being in particular situated in the interior of the gear unit, that is, being surrounded by the gear unit housing in a housing-forming manner. It is advantageous in this regard that no additional housing or additional space is required for the temporary storage unit, but that rather the existing space in the housing of the gear unit is utilizable. This particularly applies to a housing that surrounds the toothed parts substantially in the shape of a rectangular parallelepiped, a slanted area being providable that is mounted onto the rectangular parallelepiped in the area of the input shaft. Advantageously, a rectangular parallelepiped housing is manufacturable simply and cost-effectively and has a high stability at a low wall thickness and a low usage of material. Thus a substantially rectangular parallelepiped interior is available minus the rotation area of the toothed parts and the area of the shafts and bearings. This remaining space is utilizable as a temporary storage unit.

In example embodiments, the temporary storage unit is arranged as a vessel, which has cutouts so as to be drainable through these cutouts. It is advantageous in this regard that the temporary storage unit empties when the gear unit is in the state of rest, in particular with a first time constant. The feeder device in the gear unit fills the temporary storage unit at such a feed rate that the transported oil flow would fill the temporary storage unit at such a second time constant if the cutouts did not exist that this second time constant is smaller than the first time constant, in particular more than three times smaller or even more than ten times smaller.

In example embodiments, the temporary storage unit is arranged as a vessel, which has such cutouts, and the feeder device is arranged such that the maximum oil flow supplied by the feeder device, in particular when operating the gear unit at the nominal speed of the gear unit, is greater than the return oil flow from the temporary storage unit to the oil sump, which is effected by the cutouts. It is advantageous in this regard that the temporary storage unit may be filled quickly and thus the oil level of the gear unit is lowered very quickly following the start of operation. It is in particular advantageous to provide the cutouts to be so small and to provide the feeder device with such a feed rate that the supplied oil flow is at least three times or even ten times greater than the returned oil flow.

In example embodiments, the temporary storage unit has an overflow, in particular a height-adjustable overflow, via which excess oil may be drained into the oil sump. It is advantageous in this regard that the oil level may be adapted depending on the variant of the gear unit. In addition, this allows for an adaptation of the lowered oil level as a function of the operating conditions and manufacturing tolerances.

In example embodiments, the feeder device has a baffle plate for collecting oil, oil dripping off the baffle plate being suppliable to the temporary storage device via a drainage channel and/or a collector channel. It is advantageous in this regard that a part of the feeder device is implementable in a simple manner and that oil sprayed around may be readily captured.

In example embodiments, the drainage channel or collector channel has a cutout, into which a pipe empties, from which a ball bearing and/or toothing may be lubricated. It is advantageous in this regard that the feeder devices are simple and cost-effective.

In example embodiments, the drainage channel is curved such that a first portion of the oil dripping off the baffle plate and collecting in the drainage channel flows into a first collector channel and a second portion of the oil dripping off the baffle plate and collecting in the drainage channel flows into a second collector channel, the temporary storage unit being fillable from the collector channels and the collector channels being situated axially on the side of one gear wheel of the gear unit. It is advantageous in this regard that the remaining space that is not part of the area of rotation of the toothed parts and that is provided in the interior of the rectangular parallelepiped gear unit become usable.

In example embodiments, at least a partial area of a toothed part of the gear unit is surrounded by a bowl such that oil is only able to spray upward, the bowl in particular having a cutout on its bottom side so as to allow for the bowl to be filled from the oil sump, in particular when the gear unit is not in operation. It is advantageous in this regard that more oil sprays off upwardly and thus an improved heat dissipation is achievable since the oil must travel a long way to the oil sump, it being in contact with the housing of the gear unit as it flows back.

In example embodiments, the feeder device includes an oil scraping device, which allows oil to be scraped from the front of a rotating gear wheel and allows the scraped oil to be supplied to the temporary storage unit or to a collector channel via a pipe, the pipe in particular being oriented upward, the gear wheel in particular being immersed at least partially in the oil sump, and the oil scraping device in particular being situated above the oil sump. It is advantageous in this regard that another cost-effective and simple feeder device is providable. It is possible in particular to achieve a feed effect so as to transport oil through the pipe into a collector device or a temporary storage unit, from which in turn a pipe leading into the surroundings may be fed. It is thus possible to transport oil into the surroundings and to dissipate the heat there in the cooling air flow, in particular using the plate-type cooler situated there.

In example embodiments, the pipe includes bores in the drive unit housing. It is advantageous in this regard that oil may be transported through these bores to the bearings, ball bearings for example. This makes it possible to ensure the lubrication of these bearings.

In example embodiments, a feeder device transports oil from the interior of the gear unit through a pipe, which is fastened on the outside of the gear unit, the pipe in particular returning the oil into the interior of the gear unit. It is advantageous in this regard that the oil may be cooled in the outer area around the gear unit, in particular in a cooling air flow that is driven by a fan impeller.

In example embodiments, the pipe has a downward slope on the outside of the gear unit, the oil in particular flowing from a collector device, such as a temporary storage unit or collector channel, situated in the interior of the gear unit, through the pipe outwards and from there back into the oil sump, the collector device in particular being situated above the oil sump. It is advantageous in this regard that the oil flow may be driven by the mere downward slope in the gravitational field, that is, passively. For this purpose, an energy loss of the gear unit is utilized to raise the oil. For the oil in the interior of the gear unit is sprayed around in operation, in particular also upwards. A portion of the oil collected there is then transported downward without an additional pump by utilizing the downward slope and is cooled in the process.

In example embodiments, the pipe provided on the outside conducts oil to a plate-type cooler, and another section of the pipe returns oil from the plate-type cooler back into the oil sump in the interior of the gear unit. It is advantageous in this regard that the oil may be transported simply and in a cost-effective manner.

In example embodiments, the plate-type cooler is fastened on the outside of the gear unit and is situated in the cooling air flow. It is advantageous in this regard that an enlarged surface is provided and thus an improved heat dissipation is achievable. In particular, the plate-type cooler may be oriented in parallel to the cooling air flow such that the flow displays as little turbulence as possible.

In example embodiments, the bearings, in particular the two bearings of the input shaft of the gear unit, are provided in one housing part, in particular in a substantially pot-shaped housing part, the housing part being provided in a screwed connection with a housing part of the gear unit. It is advantageous in this regard that the installation of the input shaft into a housing part may be prefabricated, that is, preassembled. Thus this unit comprising the input shaft, its bearings and associated seal may be stored in a warehouse and installed quickly and simply. In particular, it is also possible to produce a model line of gear units that offers a high degree of variation with few parts. For the gear unit may be implemented as a parallel-shaft gear unit if the opening in the housing of the gear unit provided for the pot-shaped housing part is closed and the input shaft is provided on an opening of the lateral wall of the gear unit. Alternatively, however, the right-angle gear stage may also be provided instead of the closing part. Thus a gear unit having an input right-angle gear stage or an input parallel-shaft gear stage may be manufactured from the same basic housing.

In example embodiments, a first bearing is implementing as a pair of bearings, a first interspace being formed in the axial direction between the paired individual bearings. It is advantageous in this regard that great lateral forces may be absorbed and thus a particularly stable gear unit may be manufactured. In particular, a pair of individual bearings that are angled against each other may be used, between the outer rings of which an interspace is thus produced.

In example embodiments, a second bearing is axially distanced from the first bearing so as to form a second interspace. It is advantageous in this regard that great lateral forces may again be absorbed. The greater the distance between the bearings, the greater the lateral forces that can be absorbed.

In example embodiments, a first bearing of the input shaft is arranged as a pair of tapered roller bearings that are angled against each other, in particular in an X arrangement, and a second bearing is arranged as a swiveling roller bearing. It is advantageous in this regard that a particularly stable system is producible that is able to accommodate lateral forces.

In example embodiments, the first and/or second interspace are connected to the interior of the gear unit by one or more bores, in particular for drainage. It is advantageous in this regard that a good lubrication is achievable when the gear unit is at rest. It is advantageous for this purpose to provide the oil level of the gear unit to be appropriately high in the state of rest or to provide the position and the downward slope of the bores to be appropriately low. When the gear unit is in operation, it is possible to maintain a minimum oil level in the interspaces again by an appropriate definition of the height of the bores and of the downward slope. In particular, bores without a downward slope may also be used advantageously. Another advantage of draining the interspaces is that no great oil quantities are permanently present on the input-side seal and thus it is possible to reduce the danger of oil escaping.

In example embodiments, the first and/or second interspace is connected to the interior of the gear unit by a gap, in particular for drainage, the gap being formed between the housing part, in particular the substantially pot-shaped housing part, and the housing part of the gear unit. It is advantageous in this regard that a passage for oil may be provided in a simple manner and thus the interspace may be emptied without additional expenditure.

In example embodiments, a bore or one of the bores is a radial bore. It is advantageous in this regard that a simple and inexpensive bore may be provided for drainage. In particular, this bore may be disposed in the direction of gravity such that drainage may be achieved in a particularly effective manner. A horizontal orientation of the bore is also advantageous, however, for maintaining a minimum oil level.

In example embodiments, a bore or one of the bores is an axially oriented bore. It is advantageous in this regard that a drainage to the oil sump located axially further inward may be achieved with little expenditure.

In example embodiments, the radial bore is provided to be closed on its outer end by a sealing plug. It is advantageous in this regard that not only is a simple and cost-effective radial bore sufficient for drainage, but that an access to the area of the bearings is created as well. Thus sensors, for example for determining the speed of the input shaft, the lateral force or the axial force, may be situated in the area of the bearings, or also sensors for monitoring the functioning of the bearings such as temperature sensors or structure-borne noise sensors. The associated signal lines are able to be conducted out through the radial bore and the accordingly tightly closing sealing plug without particular effort.

In example embodiments, an input shaft is provided to be sealed against the housing part, in particular against the pot-shaped housing part, by a shaft sealing ring. It is advantageous in this regard that oil may be prevented from escaping.

In example embodiments, the height of the bore or of the gap for draining an interspace determines a minimum oil level for the bearings of the input shaft. It is advantageous in this regard that the minimum oil level may be maintained in a simple manner with little expenditure.

LIST OF REFERENCE NUMERALS

1 Housing part
2 Fan impeller
3 Cooling fins
4 Housing cover with cooling fins
5 Cooling fins of the housing cover 4
6 Cooling fins on the slanted housing part
7 Output shaft
8 Slanted housing area for the right-angle gear stage
9 Cooling fins
41 Rotary flange part, connected to output shaft 7 in a rotationally fixed manner
42 Air guide encasement
50 Drain pipe
51 Feed pipe
52 Plate-type cooler
53 Drain pipe
60 Feed pipe
61 Feed pipe
62 Drain pipe
70 Operating level of the oil
71 Standstill level of the oil
72 Bearing
73 Bowl for tapered gear wheel
74 Bowl for bevel pinion
80 Temporary storage unit
90 Lateral collector pockets
91 Drainage opening for bearing lubrication
92 Baffle plate
93 Oil guide channel
100 Pipe
101 Scraper
120 Gear wheel
130 Roof-shaped housing cover
131 Protective plate
132 Overflow
151 Housing cover
160 Gear unit housing
161 Gap
162 Swiveling roller bearing
163 Gap
164 Bore
165 Housing part, pot-shaped
166 Tapered roller bearings angled against each other in an X arrangement
167 Flange part
168 Shaft sealing ring
169 Interspace area between the two tapered roller bearings
170 Bore, radial
171 Sealing plug
172 Interspace area
173 Bore, axial Example embodiments of the present invention are explained in greater detail with reference to the Figures.

BRIEF DESCRIPTION OF THE DRAWINGS

FIG. 18 shows the view from another viewing direction.

DETAILED DESCRIPTION

Figure 1:
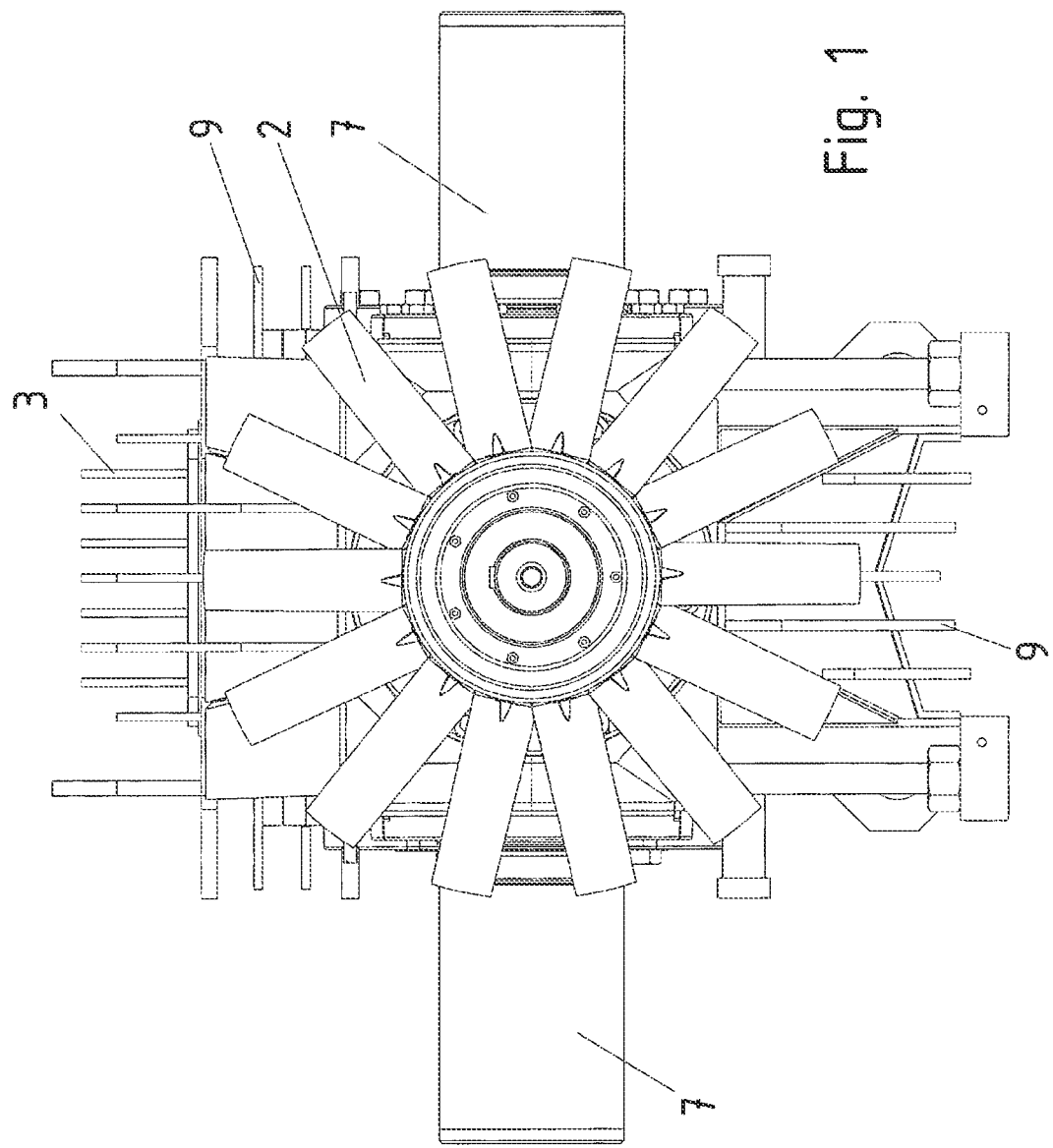
FIG. 1 shows a front view of a first gear unit of an example embodiment of the present invention.
Figure 2:
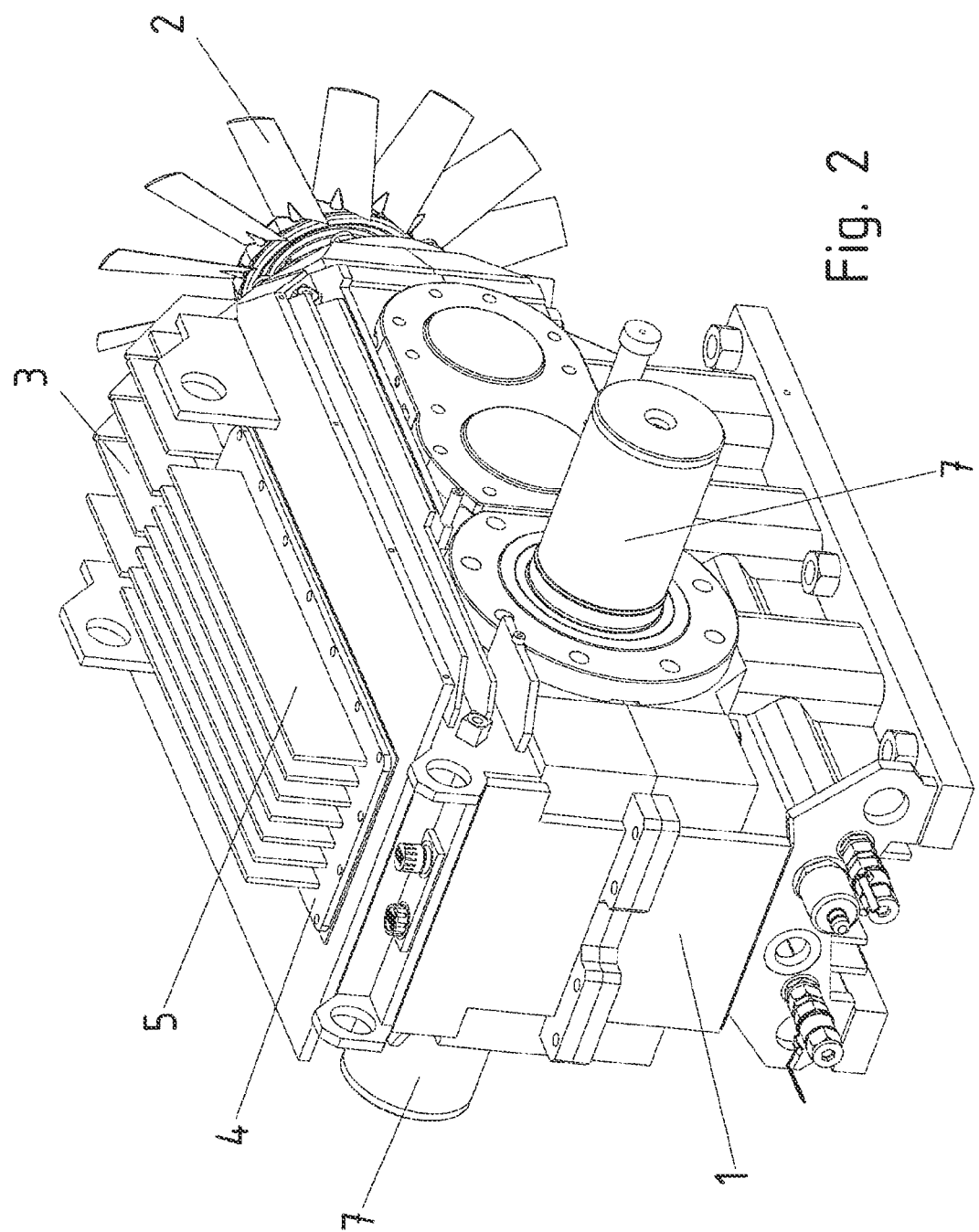
FIGS. 2 and 3 show the gear unit as shown in FIG. 1 from two different directions.
Figure 3:
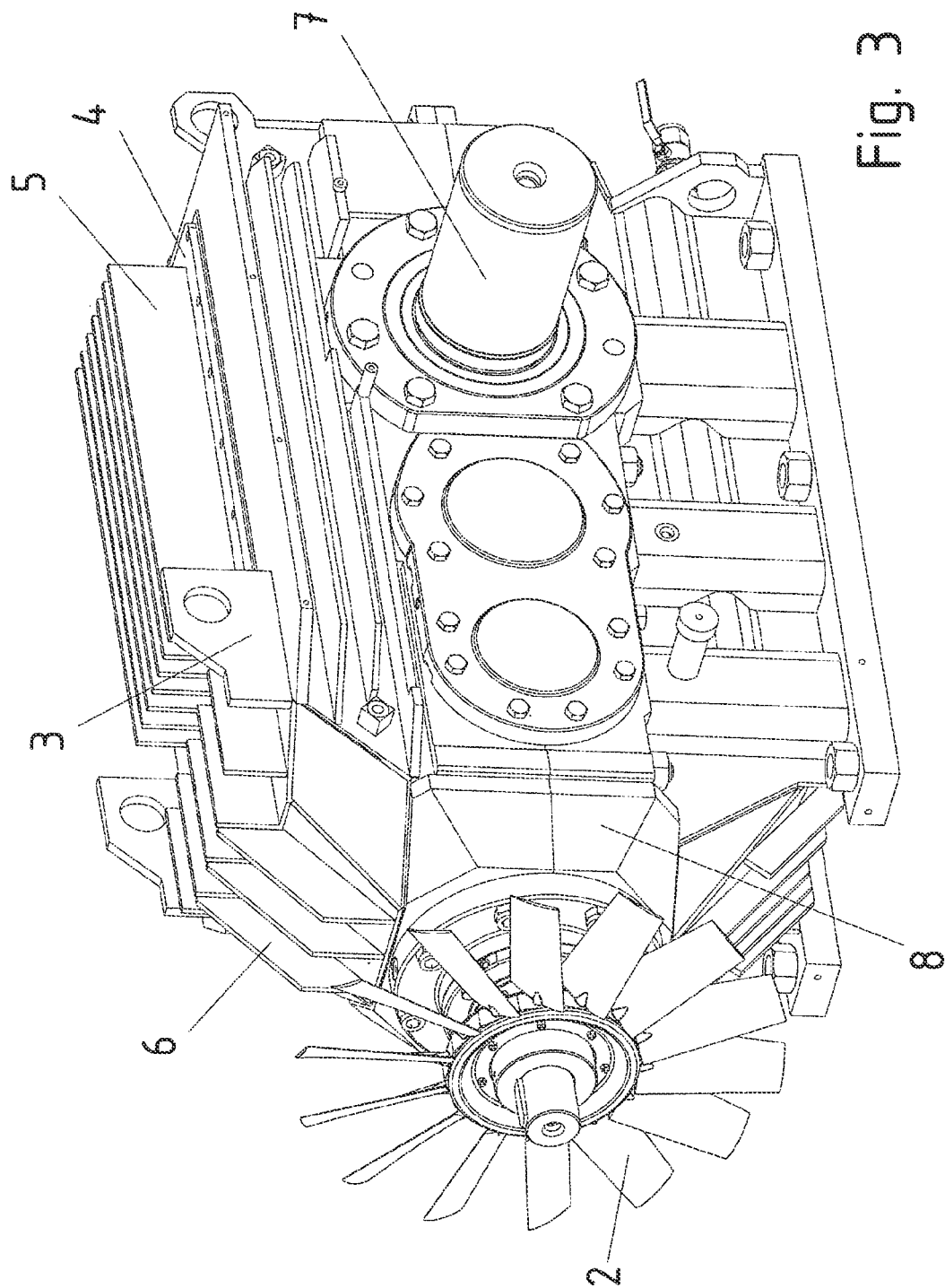

In the exemplary embodiment shown in FIGS. 1 through 3, a fan impeller 2 is connected on the input shaft in a rotationally fixed manner. The fan impeller is thus operated at a suitably high rotational speed and produces a powerful air flow using its fan impeller vanes when the gear unit is operated at the nominal rotational speed. The higher the rotational speed and the torque, the higher is also the power loss, that is, the thermal power to be dissipated to the surroundings.

The cooling air flow produced by fan impeller 2 is conducted along a slanted housing area 8. This is either produced by mounting suitably formed pieces of sheet metal and connecting them to housing part 1 or alternatively by forming housing part 1 suitably, which may be accomplished without special additional effort particularly in the case of an input right-angle gear stage.

Furthermore, cooling fins 6 are provided on slanted housing area 8 and cooling fins 3 and 9 on housing part 1.

A housing cover 4 having cooling fins 5 is also provided on the housing part for mounting and maintenance purposes.

In this manner, the cooling air flow may be utilized in optimized fashion.

Output shaft 7 is developed on two sides, but may also be arranged on one side only in other exemplary embodiments.

Figure 4:
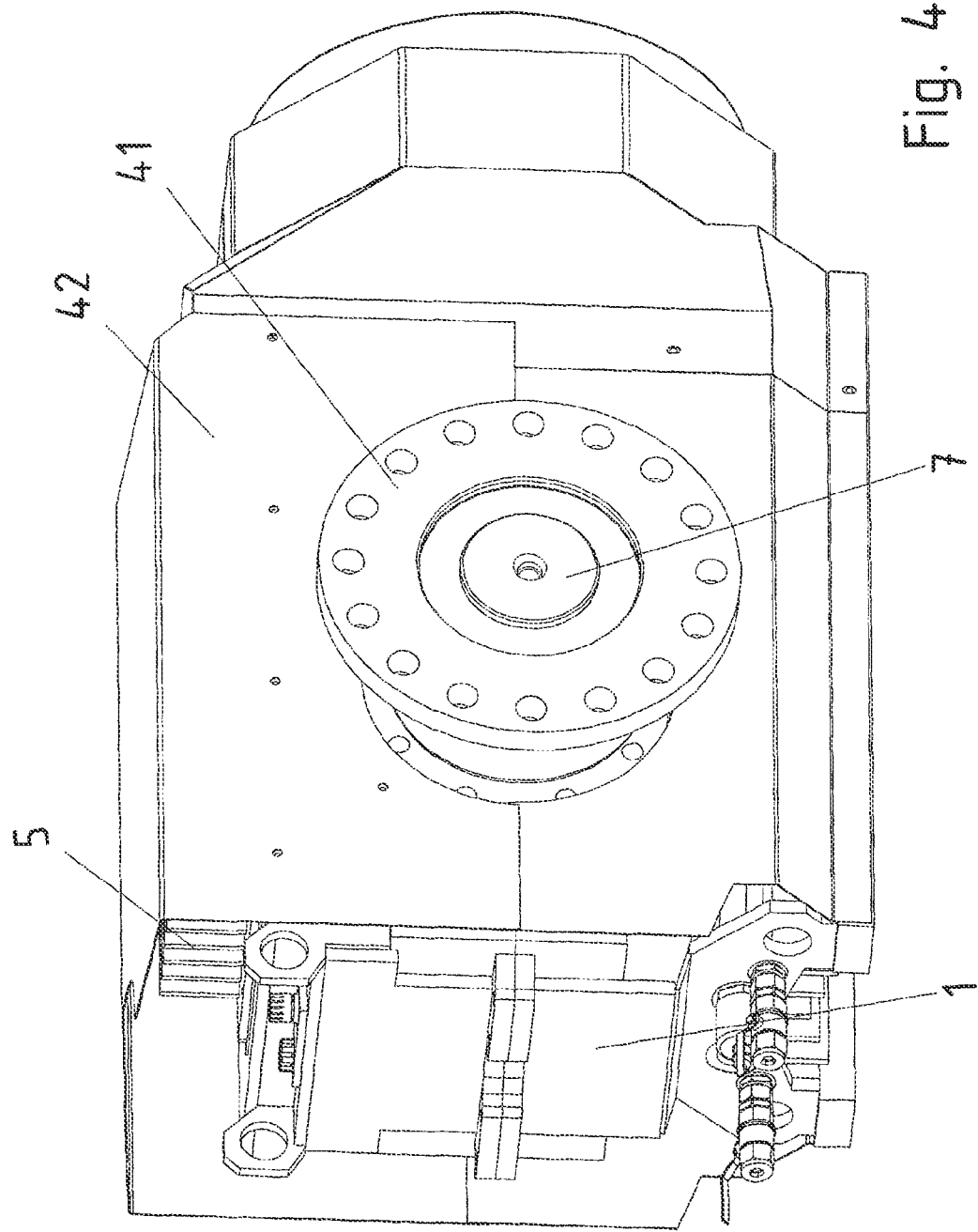
FIG. 4 shows another gear unit according to an example embodiment of the present invention, an encasement being additionally provided in contrast to FIGS. 1 through 3.

In FIG. 4, an additional air guide part, that is, an air guide encasement 42 is provided on the gear unit. A passage is provided for input shaft and output shaft 7. In another contrast to FIGS. 1 through 3, output shaft 7 is connected to a rotary flange part 41 in a rotationally fixed manner.

Air guide encasement 42 reduces the tendency of the cooling air flow to drift off and thus results in a more powerful heat dissipation. In addition, it also serves to protect against dust deposits on the gear unit housing and thus protects against a deterioration of the heat transfer resistance from the gear unit housing to the cooling air flow.

Moreover, additional parts or components to be cooled may be disposed between the gear unit housing and the air guide encasement such as power electronics or cooling devices for cooling oil for example. The subsequent figures describe exemplary embodiments of the latter.

Figure 5:
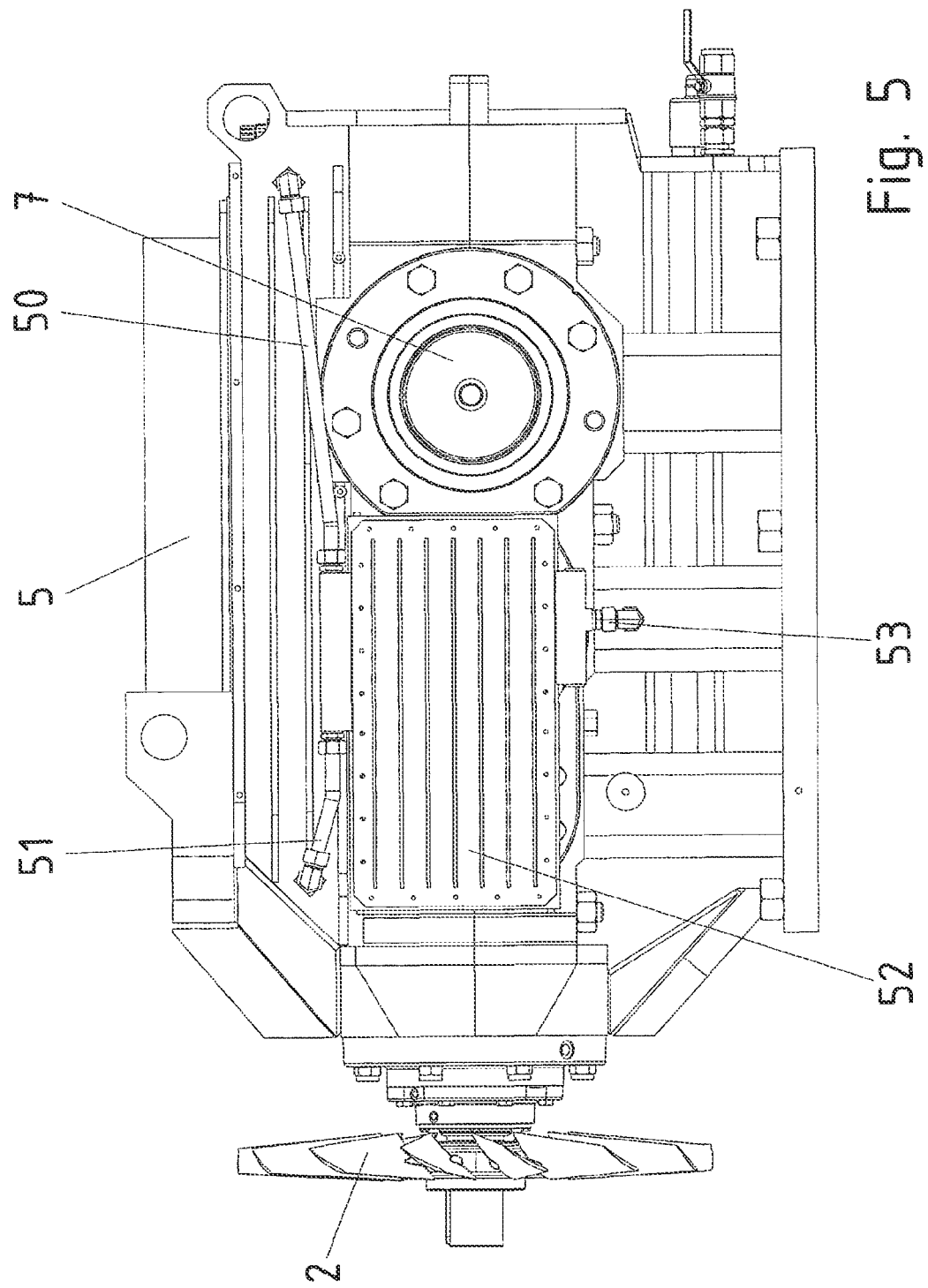
FIG. 5 shows another gear unit according to an example embodiment of the present invention having a plate-type cooler 52, which is fastened to the housing of the gear unit.

In FIG. 5, a plate-type cooler 52 is fastened to housing 1 of the gear unit, which has oil supplied to it from the interior of the gear unit via one or multiple feed pipes 50 and from which oil is removed via one or more drain pipes 51. The plate-type cooler preferably includes a base plate having a meander-shaped groove, a cover plate being mounted on the base plate. The oil must thus flow through the plate-type cooler in meander-shaped fashion. Alternatively, straight bores may also be implemented in a base body and the oil may be conducted through the bores, diverting pieces being provided between the end areas of the bores on the base body.

On the rear side with respect to the side of the gear unit having the plate-type cooler, thus the side not visible in FIG. 5, a plate-type cooler 52 having the corresponding pipes may likewise be provided, so that a doubling of the cooling capacity is attainable.

Figure 6:
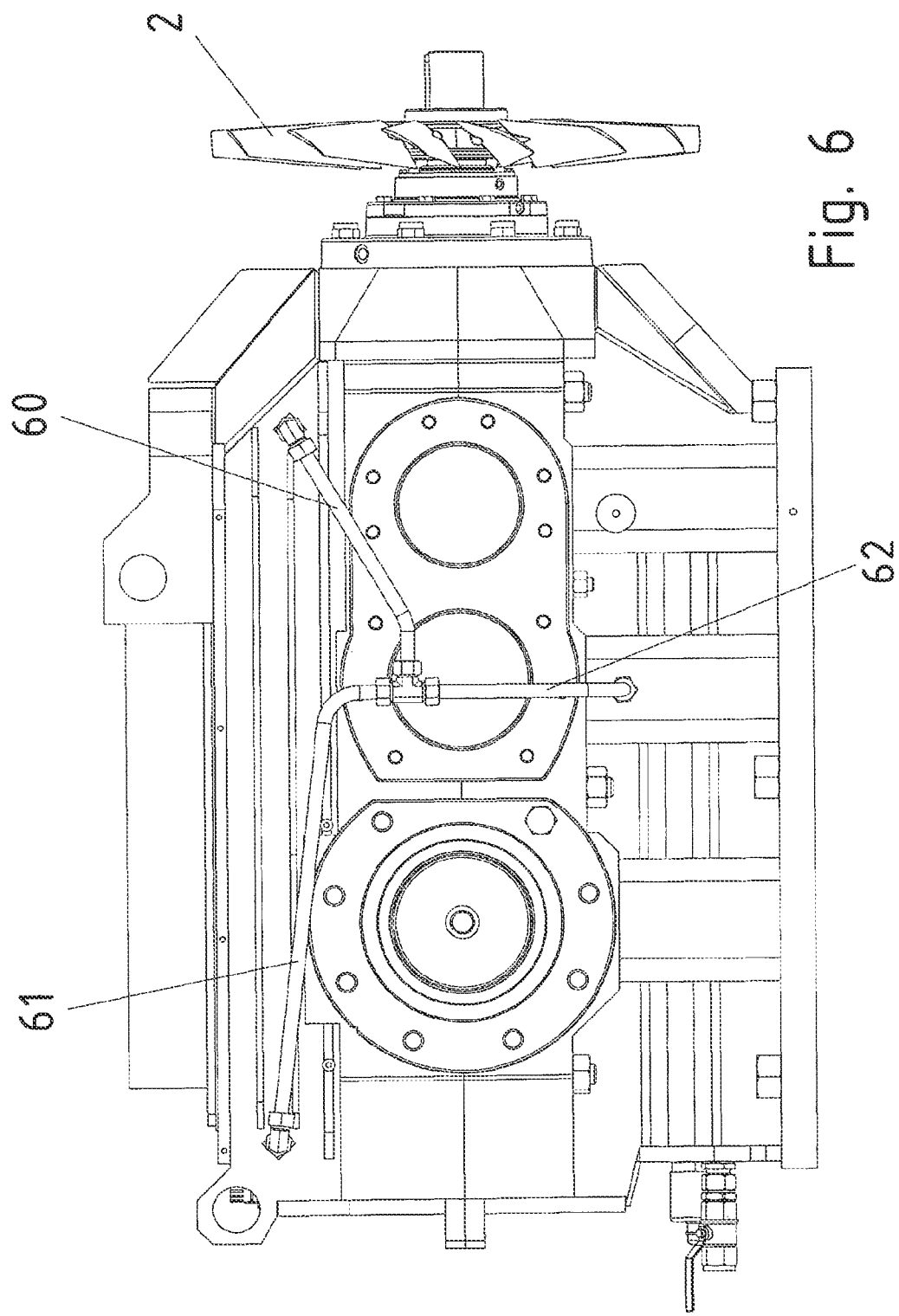
FIG. 6 shows another gear unit according to an example embodiment of the present invention, oil lines being shown that lead out of the interior of the gear unit and back into it.

Plate-type cooler 52 is omitted in FIG. 6. Feed pipes 60 and 61 are merged and open out into drain pipe 62. The pipes are thus directly exposed to the cooling air flow, and a sufficient cooling power may be achieved even without the expenditure of a plate-type cooler, particularly if oil flows through slowly.

Figure 7:
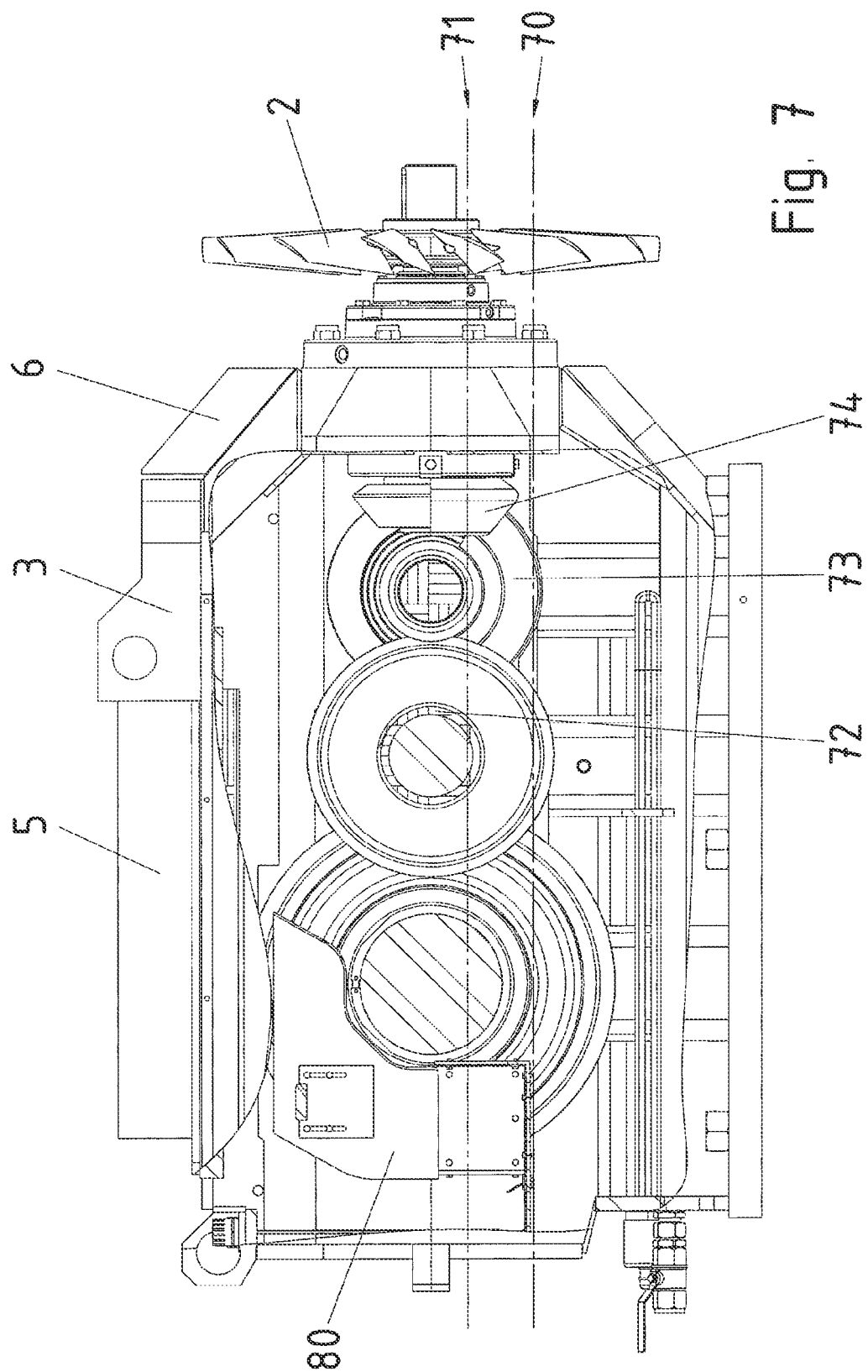
FIG. 7 shows a lateral view of another gear unit according to an example embodiment of the present invention, which is shown in a section along a lateral surface, the oil level being shown in operation and at a standstill.

FIG. 7 shows that operating level 70 of the oil is lower compared to the standstill level 71 of the oil. As the gear unit starts up, a good lubrication of all bearings is thus immediately provided, in particular also of the bearings of the input gear stage or bearings 72 of one or more of the intermediate stages of the gear unit since the oil level is so high that the bearings and toothed parts are situated sufficiently deeply in the oil sump. If the gear unit is thus started even after long periods of standstill, a good lubrication is provided.

The input stage of the gear unit is arranged as a right-angle gear stage. For this purpose, a bevel pinion is provided on the input shaft, which mates with a tapered gear wheel. Splash losses are reduced by a bowl 73 for the tapered gear wheel and a bowl 74 for the bevel pinion, which are respectively provided around the lower half of these toothed wheels. For the bowls (73, 74) are shaped such that the oil at least in the area of the bowls (73, 74) is essentially kept on a circular path when the toothed parts are rotating. The inner area between the respective bowl and the toothed part is thus freed of oil or the level of oil is at least substantially reduced in this area.

Since the bowls (73, 74) essentially surround only the lower half of the toothed parts, oil sprays only upward. Hence, when running off by the force of gravitation, the oil must traverse long paths along the inner surface of the housing and/or along a feed system, which makes it possible to achieve a good heat transfer from the oil to the gear unit housing. The bowls (73, 74) have on their lower side at least one cutout such that oil may be replenished from the oil sump into the space between the bowl (73, 74) and toothed part. However, the cutout is so small that the oil flow into the space is at least five times or at least ten times smaller than the oil flow which the toothed part is able to transport out of the space when the nominal speed of the input shaft is reached in operation.

The bowls (73, 74) are preferably arranged in a half-torus shape.

Figure 8:
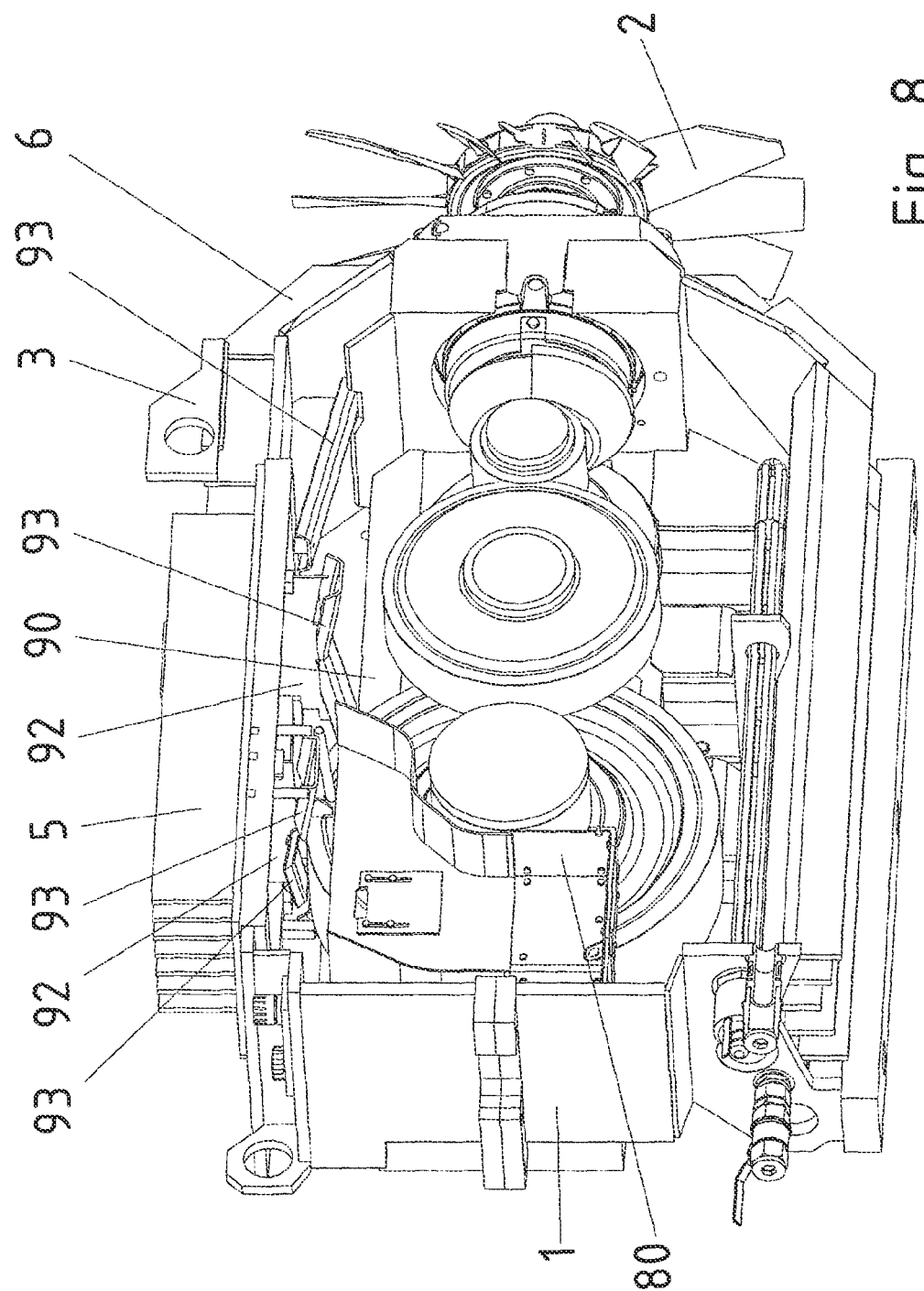
FIG. 8 shows a corresponding oblique view, in which guide channels 93 and a collector pocket 90 may be seen as well.

As shown more clearly in FIG. 8, oil is transported in operation into a higher temporary storage unit 80 using the oil feed system described in more detail below such that the oil level decreases. This lowering of the oil level in operation makes it possible to achieve a reduction of splash losses. That is to say that the toothed parts enter the oil sump only to a small extent, the quickly rotating toothed parts in particular, such as the toothed parts of the input gear stage and of one or more intermediate gear stages for example, dip less deeply or not at all into the oil sump.

Intermediate storage unit 80 has leakages or otherwise especially provided small cutouts such that the temporary storage unit empties automatically. The cutouts are provided such that in nominal operation the oil level is lowered as intended, that is, the oil flow flowing into temporary storage unit 80 is greater than the oil flow that flows back from temporary storage unit 80 into the oil sump—at least until the oil level in the temporary storage unit is below a critical value.

Thus the temporary storage unit is filled in operation using the oil feed system, and thus the oil level in the gear unit, in particular in the oil sump, is lowered as the oil level rises in temporary storage unit 80 such that the power losses are reduced.

In operation, the bearings and toothings are lubricated in that the oil pressed and/or sprayed out of the engaged toothings is collected by baffle plates 92 and drips from the latter into oil guide channels 93, which fill lateral collector pockets, from which at least a portion of the collected oil is fed to the bearings and toothed parts to be lubricated.

Figure 9:
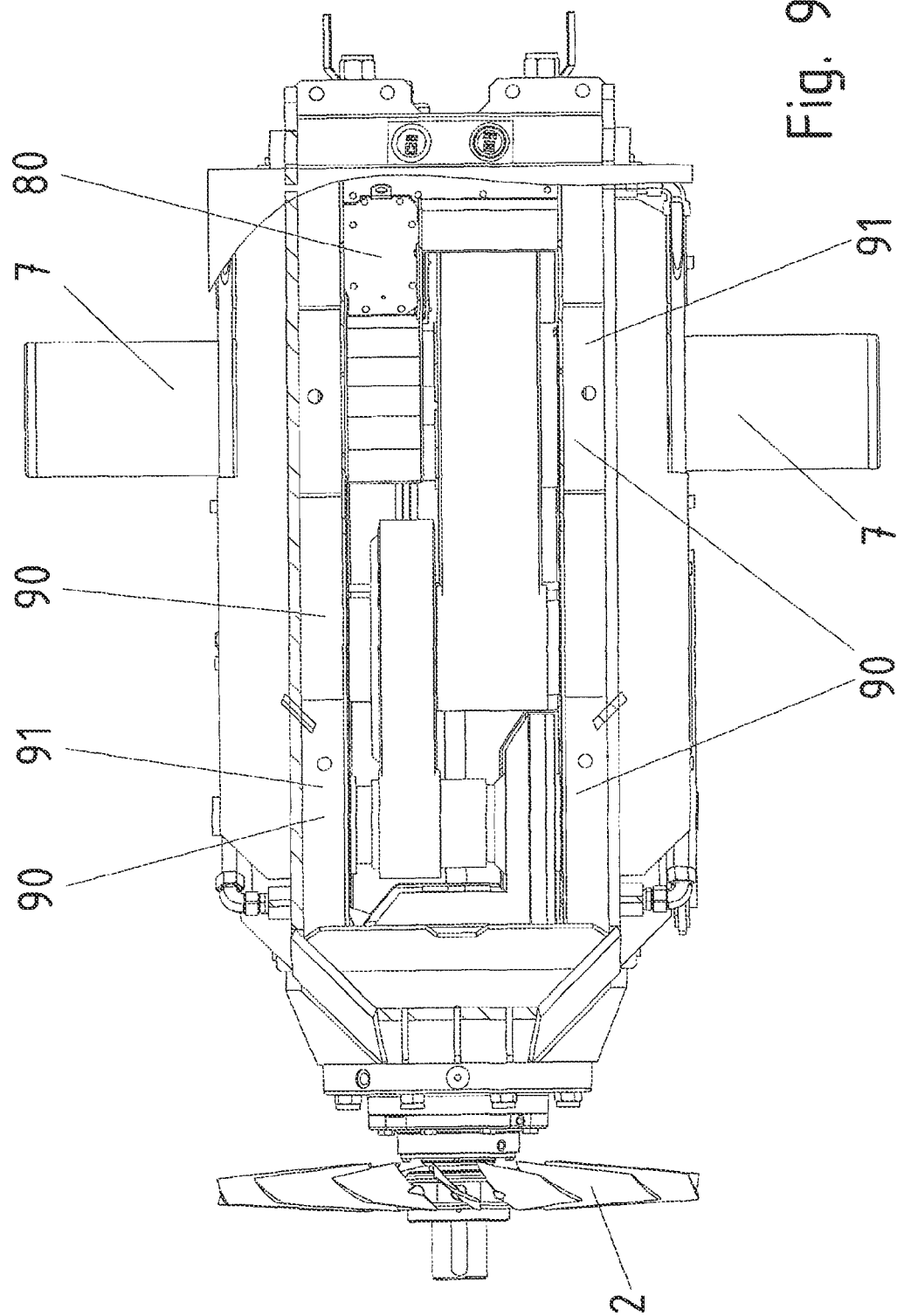
FIG. 9 shows a top view, that is, a view from above, of the gear unit from FIG. 7, which is likewise shown in a section, the section having been cut on the top side.

As shown in FIG. 9, for this purpose, the collector pockets 90 situated on both sides in the gear unit have drainage openings 91 for bearing lubrication. The drainage openings open out into bores in the housing, through which the oil is conducted to the bearing to be lubricated or via guide channels to the respective toothed part to be lubricated.

Oil guide channels 93 are arranged in a bent fashion such that one portion of the collected oil is conducted into a first and another portion into the other collector pocket 90.

It is not necessary in every case to lubricate the toothed parts and the bearings of the output shaft since these toothed parts turn slowly and thus produce only small splash losses. An immersion of these toothed parts and bearings into the oil sump is therefore not harmful.

Baffle plates 92 and oil guide channels 93 are preferably fastened on the top side of the gear unit housing.

The drain openings are situated in collector pockets 90 and the collector pockets are arranged such that the oil that arrives first when starting the gear unit is used for lubricating the bearings or toothed parts. Temporary storage unit 80 will be filled only when the collected oil flow exceeds this oil flow required for lubrication.

In another exemplary embodiment, intermediate storage unit 80 preferably has an adjustable overflow. For this purpose, a horizontal cutout may be provided in a lateral wall of temporary storage unit 80, which may be covered by a sheet metal cover piece capable of sliding in the horizontal direction. The overflow height and thus also the maximum volume of temporary storage unit 80 is thus adjustable by sliding the sheet metal cover piece.

Figure 10:
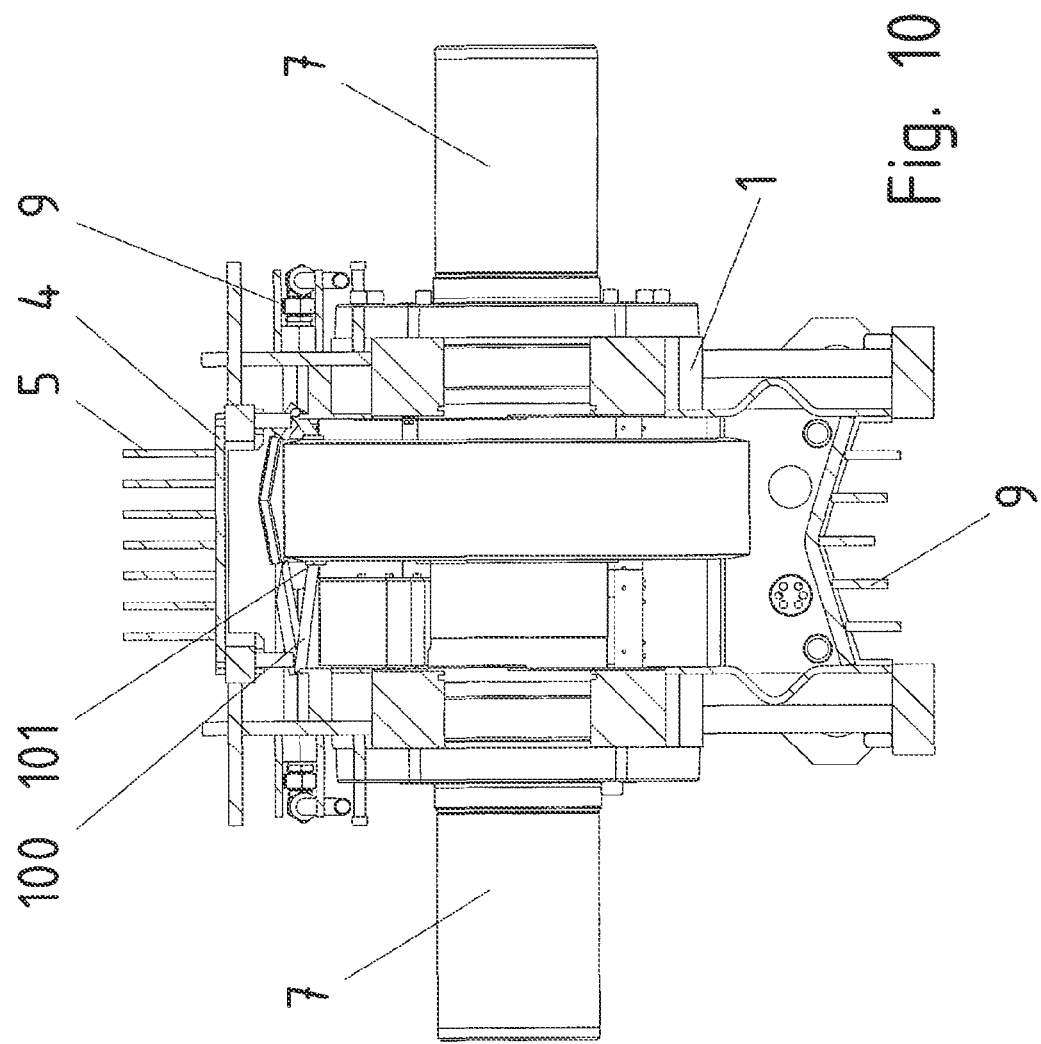
FIG. 10 shows a scraping element belonging to the oil feeder device.

FIG. 10 shows another oil feeder device, featuring a scraper 101, which scrapes off oil on a front of a gear wheel and presses it into pipe 100, from which lateral collector pockets 90 may be filled. The oil feeder device described above, including oil guide channel 93, is additionally effective. In this manner it is possible to collect oil accumulating on the gear wheel and sprayed around by the gear wheel and to use it for lubricating bearings or for lowering the oil level in operation.

Figure 11:
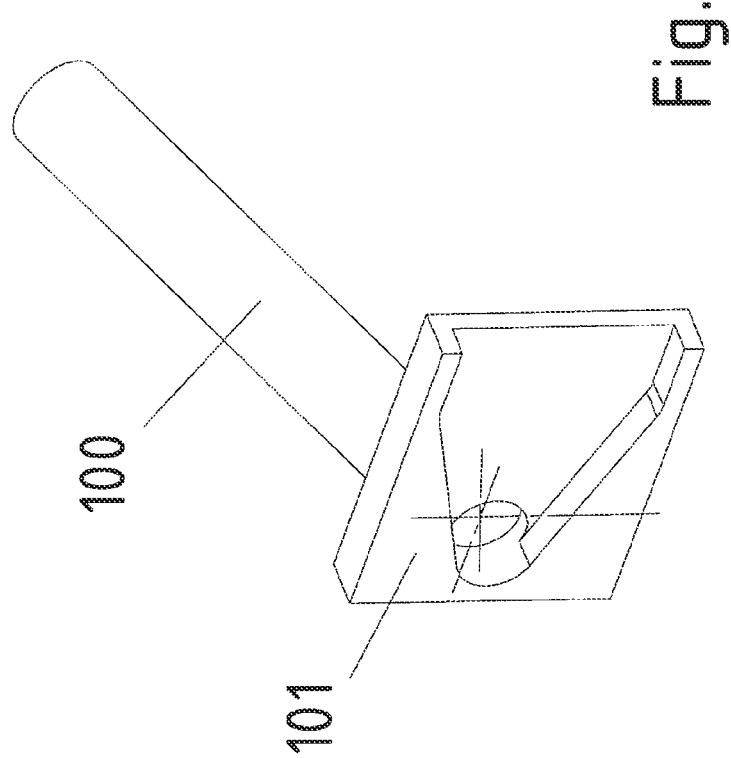
FIG. 11 shows the scraping element in an oblique view.

Scraper 101 together with pipe 100 are shown separately in FIG. 11. Here it may be seen more readily that the scraper has a V-shaped cutout, at the pointed end of which a bore is provided, into which pipe 100 opens out.

Figure 12:
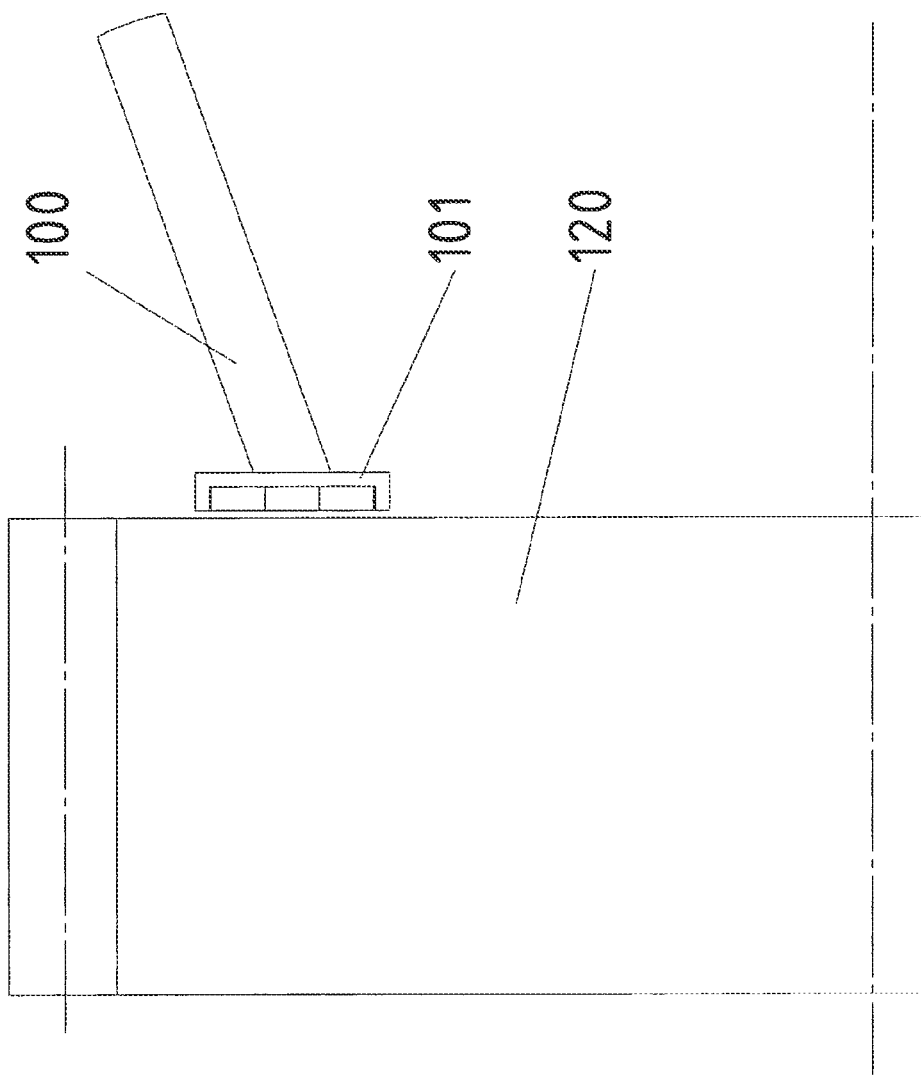
FIG. 12 shows the scraping element in a top view.

FIG. 12 shows the arrangement of scraper 101 on gear wheel 120.

Figure 13:
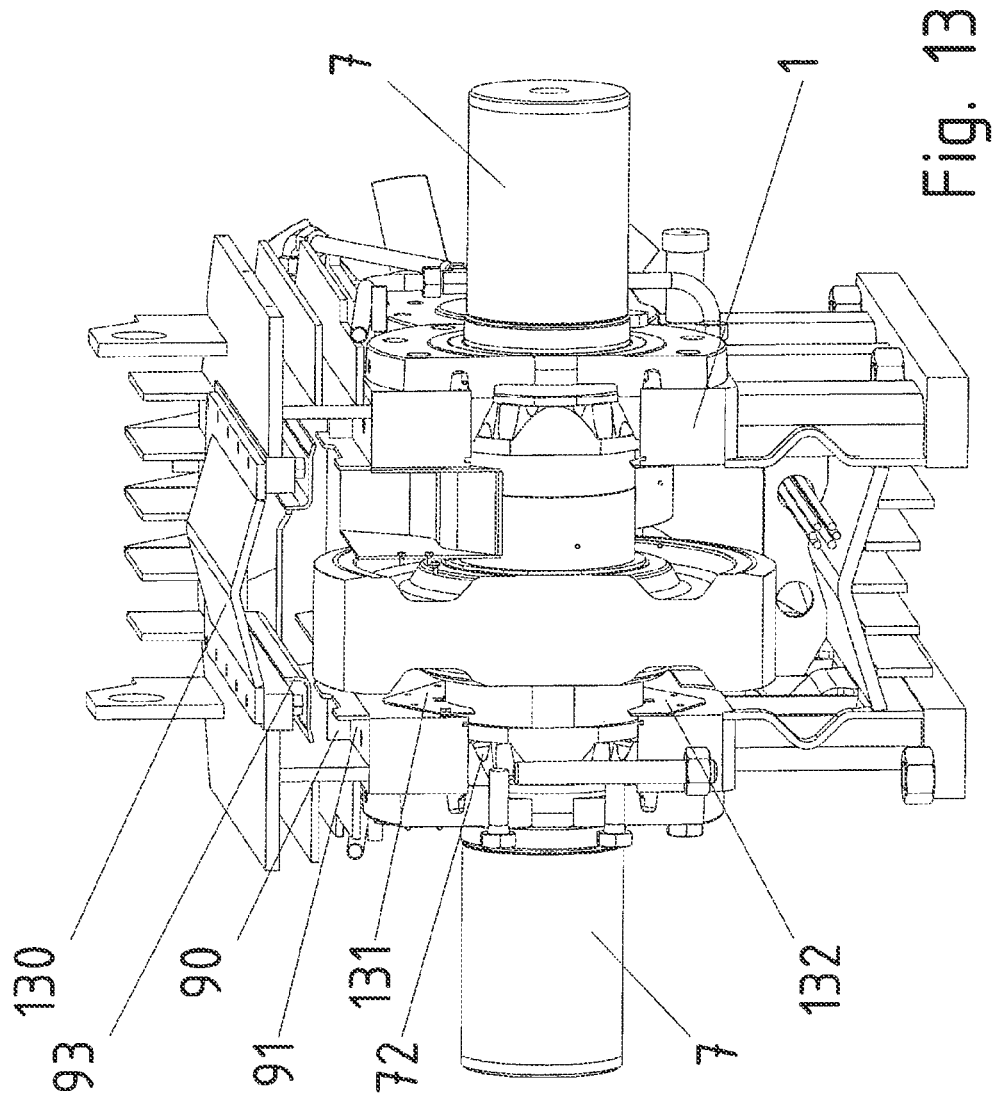
FIG. 13 shows protective plates 132 against spraying oil.

FIG. 13 shows another gear unit, in which, in contrast to the figures described above, a roof-shaped housing cover 130 is provided in place of housing cover 4. Oil dripping off the inner side of this roof-shaped housing cover may then be conducted into collector pockets 90 via oil guide channels 93. In this manner it is possible to collect and use—not the oil centrifuged in the horizontal direction as in the case of the baffle plate—but the oil centrifuged in the vertical direction against the inner side of roof-shaped housing part 130.

Figure 15:
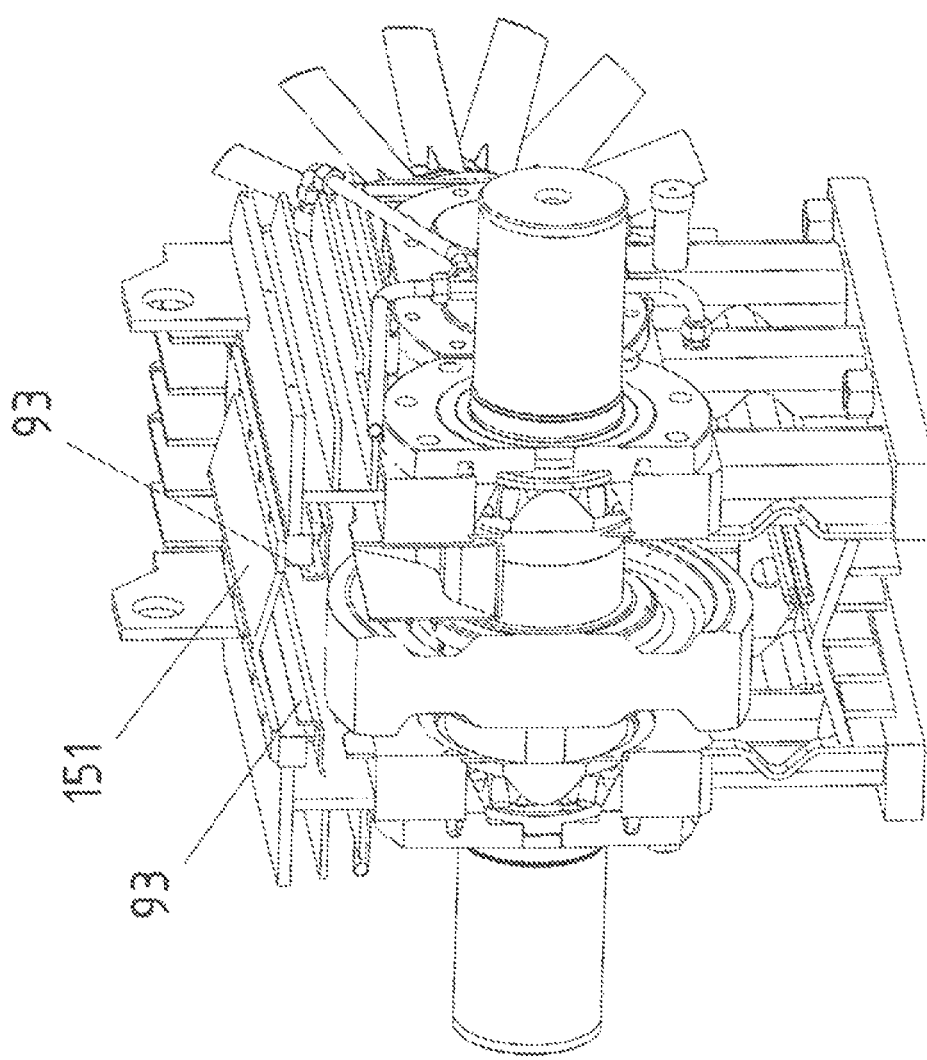
FIG. 15 shows a housing cover 151 that has a roof-like shape.

FIG. 15 shows a housing cover 151, which is developed in a V shape, that is, roof shape, the point of the V pointing upwards. The angle of the roof area, that is, the angle of the respective leg of the V to the horizontal, is greater than 10°. The angle is preferably selected such that the drops sprayed onto the inside of the roof-shaped housing cover move laterally downward on the slope of the roof under the influence of gravity, the drops being adhesively bound to the cover and then dripping into oil guide channels 93. The angle is thus always selected such that for drops sticking adhesively to the surface the force of gravitation is smaller than the adhesive force. The angle also depends substantially on the surface tension between the oil and housing cover 151.

FIG. 13 also shows protective plate 131, which is used to protect ball bearings against spraying oil or against oil foam driven in the direction of the ball bearings. Protective plate 131 is arranged to be so wide that even multiple ball bearings may be protected, in particular the ball bearing of the input shaft, an intermediate shaft and/or output shaft 7. Protective plate 131 is fastened to the inner side of the housing and has cutouts of such a size that the rotatably supported parts associated with the respective ball bearings do not touch protective plate 131.

In FIG. 13, a distance sleeve is attached on the shaft between the gear wheel and the associated ball bearing for maintaining a defined distance between the ball bearing and the gear wheel. The distance sleeve is thus provided in a cutout of protective plate 131.

Protective plate 131 has an overflow 132 such that oil from the oil sump arrives in the area of the protected ball bearings when the oil level of the oil sump is higher than the overflow, in particular the overflow edge.

Protective plate 131 is welded or screwed to the inner side of the housing such that the ball bearings are immersed in oil. Especially also in operation, that is, when the oil level falls in the oil sump, a minimum oil level still exists around the ball bearing. It is furthermore advantageous in this regard that the oil supplied to the toothed parts via the feeder device collects in the space around the ball bearing that is at least partially bounded by protective plate 131, a drainage of the oil being provided if the minimum oil level around the ball bearing rises above overflow 132.

Figure 14:
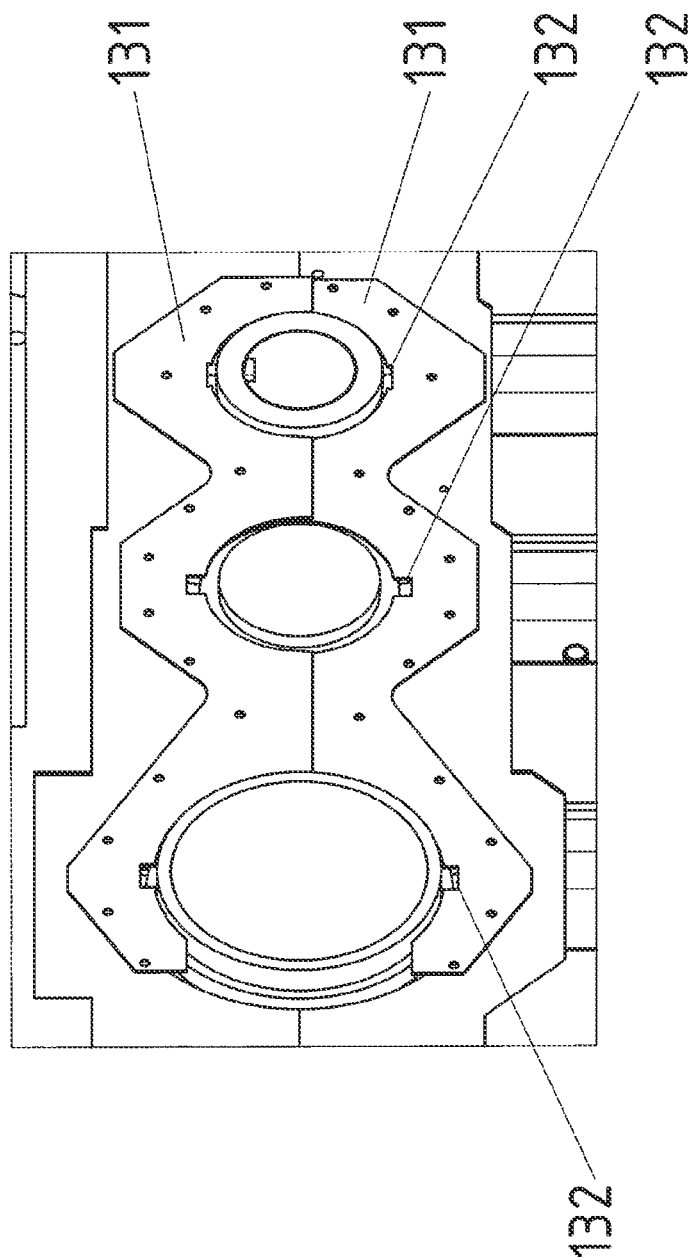
FIG. 14 shows protective plates 132 separately, these being connected to the gear unit housing.

FIG. 14 shows the embodiment with protective plate 131 in more detail. For this purpose, a lower and an upper protective plate 131 are used, the housing of the gear unit being likewise divided into a lower and an upper housing part. Lower protective plate 131 is fastened to the lower housing part, while upper protective plate 131 is fastened to the upper housing part, in particular screwed, as shown in FIG. 14, or welded, as in an alternative exemplary embodiment.

An alternative exemplary embodiment provides, instead of protective plate 131, a ring inserted into a groove, which thus defines an overflow by the lowest enclosed point. Although the ring is then not able to represent a substantial spray protection, it is able to implement the function of the overflow.

In another exemplary embodiment, a previously mentioned protective plate is used for a first bearing, while the aforementioned ring is used for another bearing.

Figure 16:
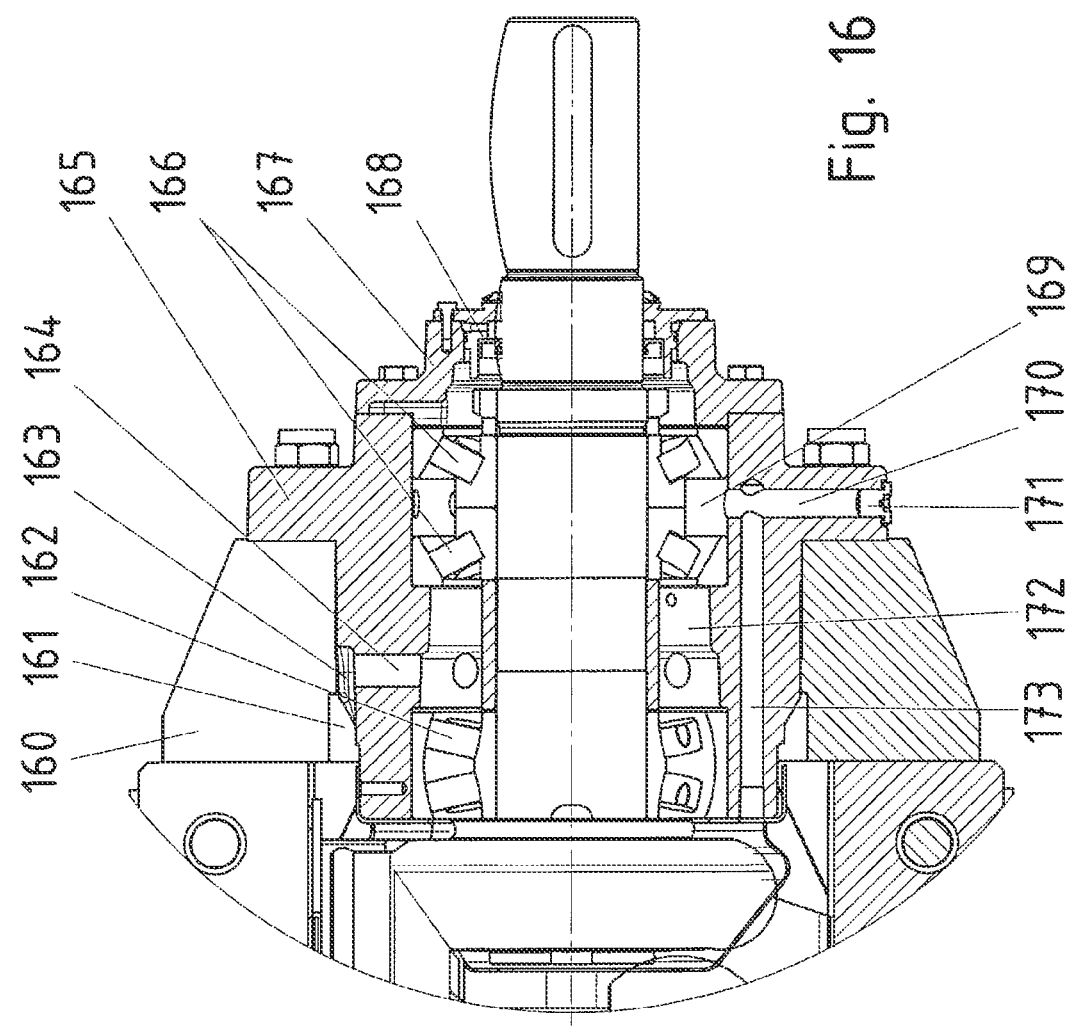
FIG. 16 shows a horizontal cross section through the input right-angle gear stage.
Figure 17:
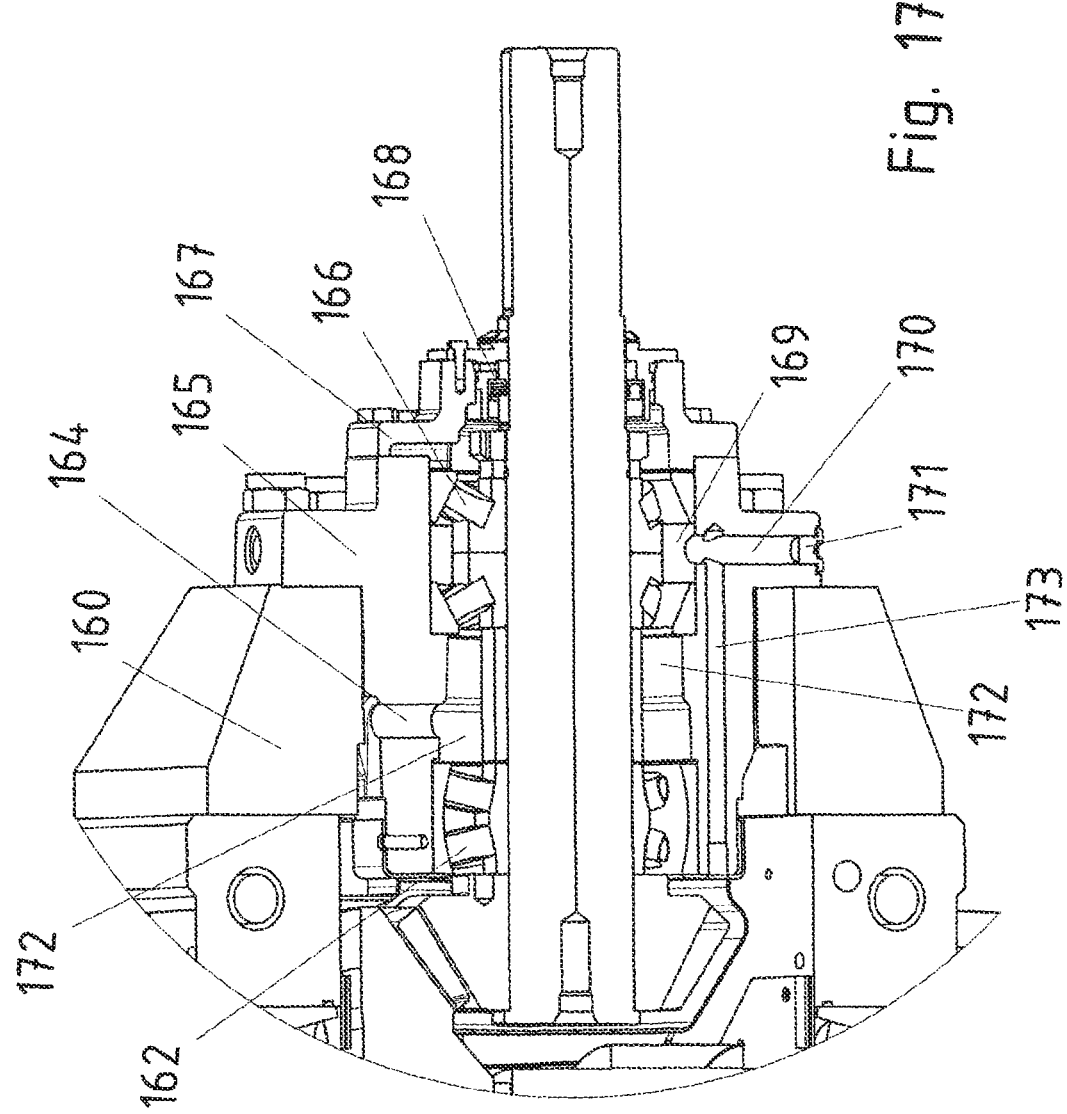
FIG. 17 shows a top view in a similar section.

The exemplary embodiment shown in FIGS. 16, 17 and 18 shows the input right-angle gear stage in more detail. This is arranged as a tapered gear stage.

At the axial end, a pot-shaped housing part 165 is screwed onto gear unit housing 160, to which in turn a flange part 167 is screwed, which receives a shaft sealing ring 168 that seals the interior of the gear unit against the outer surroundings.

In pot-shaped housing part 165, two tapered roller bearings 166 are provided angled against each other in an X arrangement, the axial distance between them producing interspace area 169. This interspace area 169 is thus bounded by the two tapered roller bearings 166 and by pot-shaped housing part 165.

When the gear unit is not in operation and the oil level is therefore high, interspace area 169 is at least partially filled with oil since the latter runs into it from the interior of the gear unit. In operation, the oil level of the oil sump in the gear unit is lowered. Interspace area 169 is drained via a radial bore 170, which opens out into interspace 169 and which is closed on its outer radial end by a sealing plug 171. An axial bore 173 leads from radial bore 170 back into the interior of the gear unit. The positioning of the bores, particularly the provided height relative to the oil sump, makes it possible to maintain a defined minimum oil level in interspace area 169. Draining interspace area 169 down to this minimum oil level results in a reduction of losses since the bearings are then less surrounded by the oil.

Another interspace area 172 between the tapered roller bearing 166 situated axially further inside and the swiveling roller bearing 162, via which the input shaft is supported in pot-shaped housing part 165, is drained in an analogous manner. Radial bore 164 is provided for this purpose, which empties into a gap 163 leading axially inward and situated between housing 160 of the gear unit and pot-shaped housing part 165, which gap widens in the axial inward direction into a gap 161.

On its axially inward end, input shaft bears the bevel pinion, which mates with a tapered gear wheel that is supported by bearings provided in housing 160 of the gear unit.

The invention claimed is:

1. A gear unit, comprising:
more than one shaft each supported by a respective bearing in a gear unit housing;
wherein a spatial region of each of the more than one shaft bearings are situated in a cutout of the gear unit housing is limited at least partially with respect to an interior of the gear unit by a limiting device that has a cutout for each of the more than one shaft supported in the respective bearings, a lowest point of the respective cutouts effecting a minimum oil level in the spatial region of each of the more than one shaft bearing;
wherein the limiting device includes a lower protective plate being fastened on the housing part, which directly and substantially surrounds a lower half of each of the more than one shafts, and an upper protective plate being fastened on the housing part, which directly and substantially surrounds an upper half of each of the more than one shafts; and
wherein the lower and upper protective plates are flat and cover an area of the respective cutouts for the bearings.

2. The gear unit according to claim 1, wherein the cutout is at least one of (a) substantially semicircular and (b) substantially circular.

3. The gear unit according to claim 1, wherein the spatial region is limited at least partially by the gear unit housing.

4. The gear unit according to claim 1, wherein the limiting device includes a ring.

5. The gear unit according to claim 4, wherein the lower and upper protective plates are at least one of (a) welded and (b) screwed onto the housing.

6. The gear unit according to claim 4, wherein the ring is provided in a groove in the housing of the gear unit that extends around the housing of the gear unit.

7. The gear unit according to claim 1, wherein the cutouts enclose each of the more than one shaft as tightly as possible, a distance of at least one of (a) less than 3 mm and (b) less than 1 mm.

8. The gear unit according to claim 1, wherein one of the more than one bearings is adapted to support an input shaft and is provided in an area of a housing part of the gear unit, a fan impeller being provided on the input shaft, at least one of (a) a slanted area of the housing part at least in a surface area adjacent to the fan impeller and (b) a slanted hood being attached to the area of the housing part.

9. The gear unit according to claim 8, wherein cooling fins are provided on at least one of (a) the slanted area of the housing part and (b) the slanted hood.

10. The gear unit according to claim 1, wherein cooling fins are provided on the housing part of the gear unit.

11. The gear unit according to claim 1, wherein a housing cover which is tightly connected to an area of the housing part, and which has cooling fins on an outside.

12. The gear unit according to claim 11, wherein the cooling fins are oriented according to a direction of a cooling air flow and are oriented in parallel to one another.

13. The gear unit according to claim 1, wherein an input gear stage is a right-angle gear stage.

14. The gear unit according to claim 1, wherein an air guide encasement is provided around the gear unit.

15. The gear unit according to claim 14, wherein the air guide encasement is adapted to guide a cooling air flow and limit it together with cooling fins and the housing of the gear unit, so that the cooling air flow absorbs thermal output of the gear unit.

16. The gear unit according to claim 14, wherein the air guide encasement includes passages for input shaft and an output shaft and for arranging the gear unit on a floor, the air guide encasement furthermore having at least one cutout for a sensor.

17. The gear unit according to claim 1, wherein a first pipe is provided to conduct oil out of an interior of the gear unit into an area of a cooling air flow and a second pipe to guide the oil back into the interior of the gear unit, the first and second pipes being arranged at least partially in the cooling air flow.

18. The gear unit according to claim 17, wherein a part of the first pipe conducted out of the interior of the gear unit is situated between the gear unit housing and an encasement.

19. The gear unit according to claim 17, wherein the oil transported by the first pipe to conduct the oil out of the interior is suppliable to a plate cooler, which is situated on the housing of the gear unit, in the cooling air flow, the second pipe adapted to return the oil being adapted to transport oil from the plate cooler back into the interior of the gear unit.

20. The gear unit according to claim 1, wherein an oil level in an oil sump of the gear unit is lower in operation than an oil level at a permanent standstill of the gear unit, and the gear unit including a temporary storage device being provided to lower the operating oil level.

21. The gear unit according to claim 1, wherein a temporary storage unit is provided, to which oil is suppliable from an oil sump of the gear unit, using a feeder device, the temporary storage unit being arranged in an interior of the gear unit and surrounded by the gear unit housing.

22. The gear unit according to claim 21, wherein the temporary storage unit is arranged as a vessel, which has cutouts so as to be drainable through the cutouts.

23. The gear unit according to claim 21, wherein the temporary storage unit is arranged as a vessel, which has cutouts, and the feeder device is arranged such that a maximum oil flow supplied by the feeder device, when operating the gear unit at a nominal speed of the gear unit, is greater than a return oil flow from the temporary storage unit to the oil sump, which is effected by the cutouts.

24. The gear unit according to claim 21, wherein the temporary storage unit includes a height-adjustable overflow, via which excess oil is drainable into the oil sump.

25. The gear unit according to claim 21, wherein the feeder device includes a baffle plate adapted to collect oil, oil dripping off the baffle plate being suppliable to the temporary storage device via at least one of (a) a drainage channel and (b) a collector channel.

26. The gear unit according to claim 25, wherein at least one of (a) the drainage channel and (b) the collector channel has a cutout, into which a pipe opens out, from which at least one of (a) a ball bearing and (b) a toothing is lubricatable.

27. The gear unit according to claim 25, wherein the drainage channel is curved such that a first portion of oil dripping off the baffle plate and collecting in the drainage channel flows into a first collector channel and a second portion of oil dripping off the baffle plate and collecting in the drainage channel flows into a second collector channel, the temporary storage unit being fillable from the collector channels and the collector channels being situated axially on a side of one gear wheel of the gear unit.

28. The gear unit according to claim 1, wherein at least a partial area of a toothed part of the gear unit is surrounded by a bowl such that oil is only able to spray upwards, the bowl having a cutout on a bottom side so as to allow for the bowl to be filled from an oil sump, when the gear unit is not in operation.

29. The gear unit according to claim 25, wherein the feeder device includes an oil scraping device, adapted to scrape oil from a front of a rotating gear wheel and adapted to supply the scraped oil to at least one of (a) the temporary storage unit and (b) a collector channel via a pipe, the pipe being oriented upwardly, the gear wheel being immersed at least partially in the oil sump, and the oil scraping device being situated above the oil sump.

30. The gear unit according to claim 29, wherein the pipe includes bores in the gear unit housing.

31. The gear unit according to claim 25, wherein the feeder device is adapted to transport oil from the interior of the gear unit through a pipe, which is fastened on an outside of the gear unit, the pipe adapted to return oil into the interior of the gear unit.

32. The gear unit according to claim 31, wherein the pipe on the outside of the gear unit has a downward slope, the oil flowing from at least one of (a) a collector device, (b) a temporary storage unit, and (c) a collector channel, situated in the interior of the gear unit, through the pipe to the outside and from there back into the oil sump, the collector device being situated above the oil sump.

33. The gear unit according to claim 31, wherein the pipe provided on the outside is adapted to conduct oil to a plate cooler, and another section of the pipe is adapted to return oil from the plate cooler back into the oil sump in the interior of the gear unit.

34. The gear unit according to claim 33, wherein the plate cooler is fastened on the outside of the gear unit and is arranged in a cooling air flow.

35. The gear unit according to claim 29, wherein the oil scraping device includes at least one of (a) a cutout, (b) an interior space, and (c) a hollow space, tapering in a direction of movement of oil to be scraped from the front of the rotatably supported gear wheel, at an end area of which the pipe is provided into which the scraped oil is pressed.

36. The gear unit according to claim 35, wherein the pipe situated on the oil scraping device extends upwardly.

37. The gear unit according to claim 36, wherein an upper end of the pipe situated on the oil scraping device is connected one of (a) directly and (b) indirectly to a pipe adapted to conduct the oil at least one of (i) out of the interior and (ii) a temporary storage unit.

38. The gear unit according to claim 1, wherein two bearings of the more than one shaft of the gear unit are provided in a substantially pot-shaped housing part, the housing part being provided in a screwed connection with the housing part of the gear unit.

39. The gear unit according to claim 38, wherein a first bearing is arranged as a pair of bearings, a first interspace being formed in an axial direction between the paired individual bearings.

40. The gear unit according to claim 39, wherein a second bearing is axially distanced from the first bearing so as to form a second interspace.

41. The gear unit according to claim 1, wherein a first bearing of the input shaft is arranged as pair of tapered roller bearings that are angled against each other, in an X arrangement, and a second bearing is arranged as a swiveling roller bearing.

42. The gear unit according to claim 40, wherein at least one of (a) the first interspace and (b) the second interspace is connected to the interior of the gear unit by at least one bore for drainage.

43. The gear unit according to claim 39, wherein at least one of (a) the first interspace and (b) the second interspace is connected to the interior of the gear unit by a gap for drainage, the gap being formed between a substantially pot-shaped housing part and the housing part of the gear unit.

44. The gear unit according to claim 42, wherein at least one bore is arranged as a radial bore.

45. The gear unit according to claim 42, wherein at least one bore is arranged as an axially oriented bore.

46. The gear unit according to claim 44, wherein the radial bore is closed on an outer end by a sealing plug.

47. The gear unit according to claim 1, wherein an input shaft is sealed against a substantially pot-shaped housing part by a shaft sealing ring.

48. The gear unit according to claim 42, wherein a height of the bore for draining an interspace determines a minimum oil level for the bearings of the input shaft.

49. The gear unit according to claim 1, wherein the housing of the gear unit includes a lower housing part and an upper housing part, the lower protective plate fastened on the lower housing part, and the upper protective plate fastened on the upper housing part.

* * * * *